(12) United States Patent
Kuroki

(10) Patent No.: US 11,555,892 B2
(45) Date of Patent: Jan. 17, 2023

(54) DRIVE DEVICE AND DISTANCE MEASUREMENT APPARATUS

(71) Applicant: PIONEER CORPORATION, Tokyo (JP)

(72) Inventor: Eiji Kuroki, Tokyo (JP)

(73) Assignee: Pioneer Corporation, Tokyo (JP)

( * ) Notice: Subject to any disclaimer, the term of this patent is extended or adjusted under 35 U.S.C. 154(b) by 89 days.

(21) Appl. No.: 16/493,707

(22) PCT Filed: Feb. 20, 2018

(86) PCT No.: PCT/JP2018/005872
§ 371 (c)(1),
(2) Date: Sep. 12, 2019

(87) PCT Pub. No.: WO2018/168349
PCT Pub. Date: Sep. 20, 2018

(65) Prior Publication Data
US 2020/0033453 A1 Jan. 30, 2020

(30) Foreign Application Priority Data
Mar. 13, 2017 (JP) .............................. JP2017-047438

(51) Int. Cl.
*G02B 26/08* (2006.01)
*G01S 7/481* (2006.01)
(Continued)

(52) U.S. Cl.
CPC .......... *G01S 7/4817* (2013.01); *G02B 26/085* (2013.01); *G02B 26/10* (2013.01); *H02K 33/18* (2013.01)

(58) Field of Classification Search
USPC ............................................... 359/224.1, 904
See application file for complete search history.

(56) References Cited

U.S. PATENT DOCUMENTS

| 5,610,752 A | * | 3/1997 | Hayakawa | ........... G02B 7/1821 |
| | | | | 359/198.1 |
| 6,775,043 B1 | * | 8/2004 | Leung | .................. G02B 6/3518 |
| | | | | 359/200.8 |

(Continued)

FOREIGN PATENT DOCUMENTS

| EP | 2990375 A2 | 3/2016 |
| EP | 3029818 A1 | 6/2016 |

(Continued)

OTHER PUBLICATIONS

International Search Report for related International Application No. PCT/JP2018/005872, dated May 28, 2018; 1 page.

(Continued)

*Primary Examiner* — Jennifer D. Carruth
(74) *Attorney, Agent, or Firm* — Procopio, Cory, Hargreaves & Savitch LLP

(57) ABSTRACT

A drive device (10) includes a support (23), a first movable portion (21), a first magnet (41), a second magnet (42), a first coil (31), and a second coil (32). The first movable portion (21) is swingable in two axial directions with respect to the support (23). The first magnet (41) is positioned inside the first movable portion (21) when viewed from a first direction. The second magnet (42) is positioned outside the first movable portion (21) when viewed from the first direction. Magnetic flux from the first magnet (41) acts on the first coil (31). Magnetic flux from the second magnet (42) acts on the second coil (32).

24 Claims, 20 Drawing Sheets

(51) Int. Cl.
*G02B 26/10* (2006.01)
*H02K 33/18* (2006.01)

(56) References Cited

U.S. PATENT DOCUMENTS

| | | | |
|---|---|---|---|
| 7,012,737 | B2 | 3/2006 | Iwasaki et al. |
| 7,095,549 | B2 | 8/2006 | Iwasaki et al. |
| 7,442,918 | B2 | 10/2008 | Sprague et al. |
| 7,482,730 | B2 | 1/2009 | Davis et al. |
| 7,485,485 | B2 | 2/2009 | Linden et al. |
| 7,515,329 | B2 | 4/2009 | Sprague et al. |
| 7,636,101 | B2 | 12/2009 | Sprague et al. |
| 7,724,411 | B2 | 5/2010 | Ko et al. |
| 8,928,963 | B2 | 1/2015 | Iseki |
| 9,729,038 | B2 | 8/2017 | Takimoto et al. |
| 10,394,017 | B2 | 8/2019 | Takimoto et al. |
| 10,549,981 | B2 | 2/2020 | Takimoto et al. |
| 2004/0105139 | A1* | 6/2004 | Hirose ............ B81B 3/0018 359/199.3 |
| 2005/0099709 | A1 | 5/2005 | Iwasaki et al. |
| 2005/0173770 | A1 | 8/2005 | Linden et al. |
| 2005/0179976 | A1 | 8/2005 | Davis et al. |
| 2005/0253055 | A1 | 11/2005 | Sprague et al. |
| 2005/0280879 | A1 | 12/2005 | Gibson et al. |
| 2006/0098313 | A1 | 5/2006 | Iwasaki et al. |
| 2007/0109560 | A1 | 5/2007 | Sprague et al. |
| 2008/0042052 | A1 | 2/2008 | Sprague et al. |
| 2008/0143196 | A1 | 6/2008 | Sprague et al. |
| 2008/0143451 | A1 | 6/2008 | Sprague et al. |
| 2008/0231930 | A1* | 9/2008 | Mizoguchi ......... G02B 26/085 359/224.1 |
| 2009/0080049 | A1 | 3/2009 | Ko et al. |
| 2014/0104840 | A1 | 4/2014 | Iseki |
| 2014/0349434 | A1* | 11/2014 | Huang ............ B81C 1/00301 438/51 |
| 2016/0071416 | A1* | 3/2016 | Kim ................... B60T 7/22 701/70 |
| 2016/0172951 | A1 | 6/2016 | Takimoto et al. |
| 2017/0293136 | A1 | 10/2017 | Takimoto et al. |
| 2018/0148314 | A1 | 5/2018 | Takimoto et al. |
| 2019/0302612 | A1* | 10/2019 | Iwatani ............ G03F 7/70758 |
| 2021/0088779 | A1* | 3/2021 | Iguchi ............. G02B 26/124 |

FOREIGN PATENT DOCUMENTS

| | | |
|---|---|---|
| JP | 2009-075587 A | 4/2009 |
| JP | 2009-089501 A | 4/2009 |
| JP | 4968760 B1 | 7/2012 |
| JP | 2014-077961 A | 5/2014 |
| WO | 2013-065126 A1 | 5/2013 |
| WO | 2013065126 A1 | 4/2015 |
| WO | 2016002453 A1 | 1/2016 |

OTHER PUBLICATIONS

Extended European Search Report for related EP App. No. 18767702.6 dated Dec. 3, 2020; 11 pages.

* cited by examiner

DRIVE DEVICE AND DISTANCE MEASUREMENT APPARATUS

CROSS-REFERENCE TO RELATED APPLICATIONS

This application is a U.S. National Stage entry of PCT Application No: PCT/JP2018/005872 filed Feb. 20, 2018, which claims priority to Japanese Patent Application No. 2017-047438, filed Mar. 13, 2017, the contents of which are incorporated herein by reference.

TECHNICAL FIELD

The present invention relates to a drive device and a distance measurement apparatus.

BACKGROUND ART

In a measurement apparatus using light and the like, a small drive device capable of two-axis drive is required.

In Patent Document 1, a two-axis drive electromagnetic scanner including an outer drive unit and an inner drive unit is described. In the scanner of Patent Document 1, an outer drive coil is fixed to the outer drive unit, an inner drive coil is fixed to the inner drive unit, and a stage having a mirror surface and the inner drive unit are disposed inside the outer drive unit.

RELATED DOCUMENT

Patent Document

[Patent Document 1] Japanese Unexamined Patent Publication No. 2009-75587

SUMMARY OF THE INVENTION

Technical Problem

However, in the technique of Patent Document 1, since it is necessary to dispose the outer drive unit so as to surround the inner drive unit and to dispose a coil in each of the inner drive unit and the outer drive unit, miniaturization is difficult.

As one of the problems to be solved by the present invention, provision of a drive device which can be easily miniaturized may be included as an example.

Solution to Problem

The invention described in claim 1 is a drive device including a support, a first movable portion swingable in two axial directions with respect to the support, a first magnet positioned inside the first movable portion and a second magnet positioned outside the first movable portion when viewed from a first direction, and a first coil on which magnetic flux from the first magnet acts and a second coil on which magnetic flux from the second magnet acts.

The invention described in claim 3 is a drive device including a support, a first movable portion swingable in two axial directions with respect to the support, a first magnet and a second magnet, a magnetic member including one or more facing members facing at least one of the first magnet and the second magnet, a first coil fixed to the first movable portion, passing between the first magnet and the magnetic member, and not passing between the second magnet and the magnetic member when viewed from a first direction, and a second coil fixed to the first movable portion, passing between the second magnet and the magnetic member, and not passing between the first magnet and the magnetic member when viewed from the first direction.

The invention described in claim 21 is a distance measurement apparatus including the drive device according to any one of claims 1 to 20.

BRIEF DESCRIPTION OF THE DRAWINGS

The object described above, and other objects, features, and advantages will become more apparent from the preferred embodiments described below and the following figures associated therewith.

DESCRIPTION OF EMBODIMENTS

Figure 1:
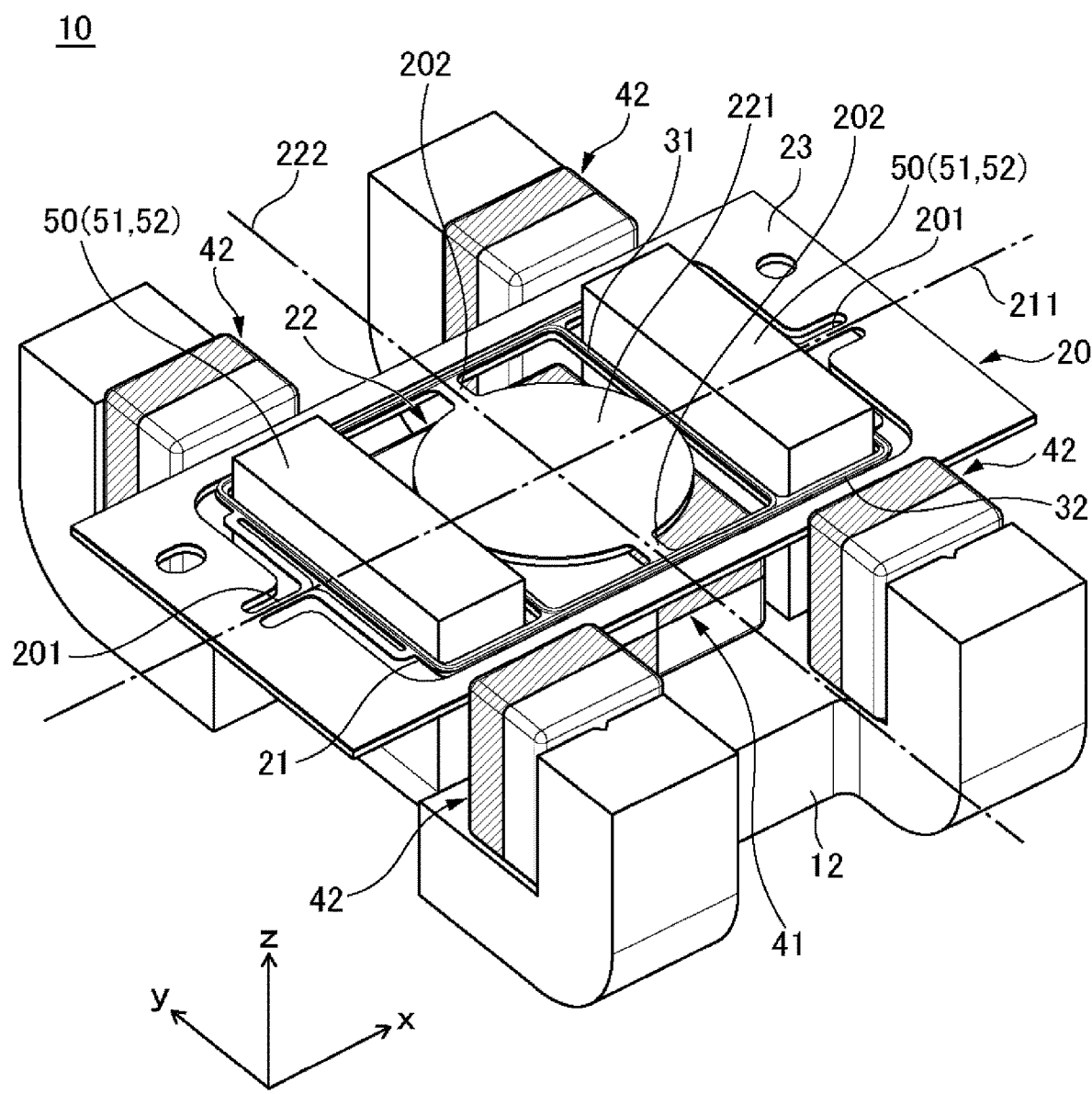
FIG. 1 is a perspective view illustrating a configuration of a drive device according to an embodiment.

Hereinafter, embodiments of the present invention will be described with reference to the figures. In all the figures, the same constitutional elements are denoted by the same reference numerals, and the description thereof will be omitted as appropriate.

Embodiment

Figure 2A:
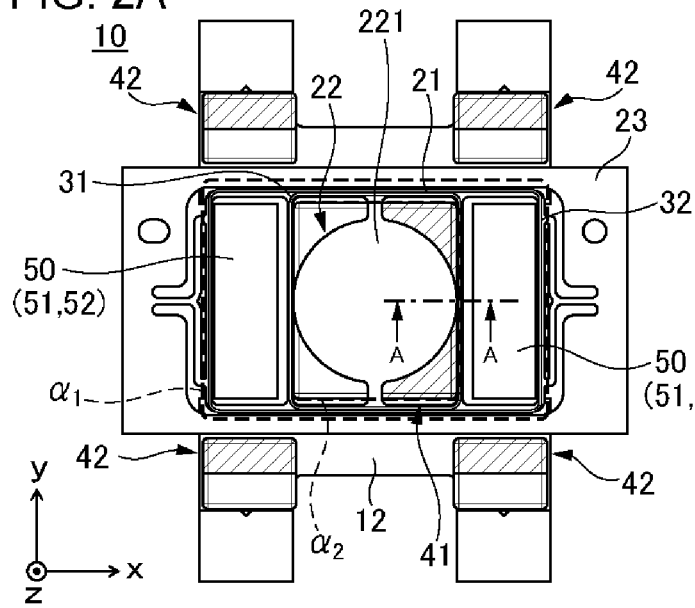
FIG. 2(*a*) is a plan view illustrating the configuration of the drive device according to the embodiment, FIG. 2(*b*) is a right side view illustrating the configuration of the drive device according to the embodiment, FIG. 2(*c*) is a front view illustrating the configuration of the drive device according to the embodiment, and FIG. 2(*d*) is a bottom view illustrating the configuration of the drive device according to the embodiment.
Figure 2B:
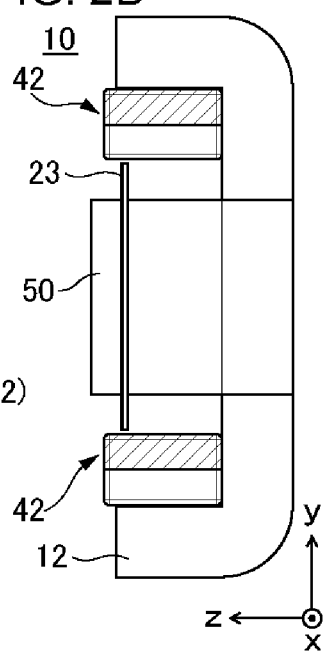
Figure 2C:
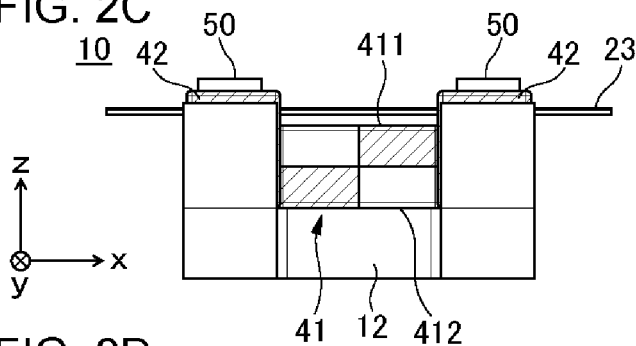
Figure 2D:
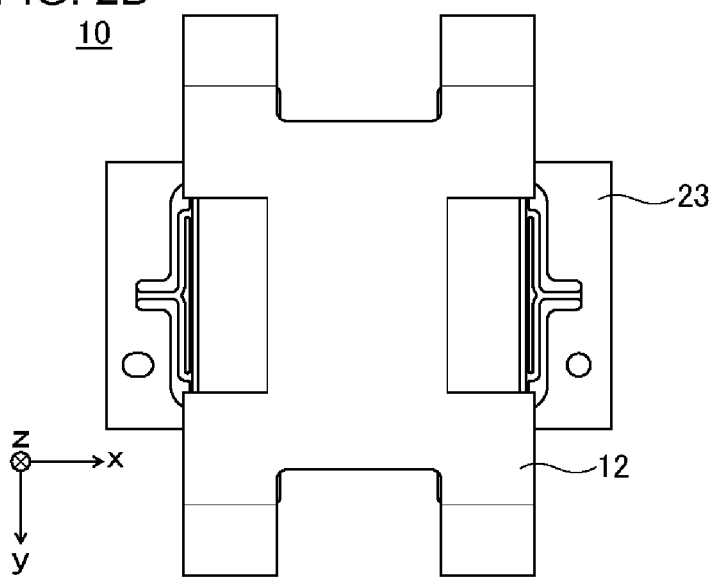

FIG. 1 is a perspective view illustrating the configuration of a drive device 10 according to the embodiment. FIG. 2(a) is a plan view illustrating the configuration of the drive device 10 according to the embodiment, FIG. 2(b) is a right side view illustrating the configuration of the drive device 10 according to the embodiment, FIG. 2 (c) is a front view illustrating the configuration of the drive device 10 according to the embodiment, and FIG. 2(d) is a bottom view illustrating the configuration of the drive device 10 according to the embodiment.

The drive device 10 according to this embodiment includes a support 23, a first movable portion 21, a first magnet 41, a second magnet 42, a first coil 31, and a second coil 32. The first movable portion 21 is swingable in two axial directions with respect to the support 23. The first magnet 41 is positioned inside the first movable portion 21 when viewed from the first direction. The second magnet 42 is positioned outside the first movable portion 21 when viewed from the first direction. Magnetic flux from the first magnet 41 acts on the first coil 31. Magnetic flux from the second magnet 42 acts on the second coil 32.

The drive device 10 according to this embodiment may be expressed as follows. The drive device 10 includes the support 23, the first movable portion 21, the first magnet 41, the second magnet 42, a magnetic member 50, the first coil 31, and the second coil 32. The first movable portion 21 is swingable in two axial directions with respect to the support 23. The magnetic member 50 includes one or more facing members facing at least one of the first magnet 41 and the second magnet 42. The first coil 31 is fixed to the first movable portion 21 and passes between the first magnet 41 and the magnetic member 50 and does not pass between the second magnet 42 and the magnetic member 50, when viewed from the first direction. The second coil 32 is fixed to the first movable portion 21 and passes between the second magnet 42 and the magnetic member 50 and does not pass between the first magnet 41 and the magnetic member 50, when viewed from the first direction. Details will be described below.

In the examples illustrated in FIG. 1 and FIGS. 2(a) to 2(d), the first direction is a central axis direction of the first coil 31 in a state where no current flows in the first coil 31 and the second coil 32. In the examples illustrated in FIG. 1 and FIGS. 2(a) to 2(d), the first direction is the z-direction. The x-direction, the y-direction, and the z-direction are three directions orthogonal to one another. The surfaces of the first magnet 41 and a first facing member 51 perpendicular to the x-direction face each other, and the surfaces of the second magnet 42 and a second facing member 52 perpendicular to the y-direction face each other.

In this embodiment, the magnetic member 50 is a member containing a magnetic material. The magnetic member 50 is, for example, a member obtained by combining the first facing member 51 facing the first magnet 41 and the second facing member 52 facing the second magnet 42. The first facing member 51 and the second facing member 52 may be integrated or separated from each other. Also, the magnetic member 50 may be, for example, a single member facing the first magnet 41 and the second magnet 42. In other words, the magnetic member 50 may be a single member serving as both the first facing member 51 and the second facing member 52. In the examples illustrated in FIG. 1 and FIGS. 2 (a) to 2 (d), the magnetic member 50 is a single member serving as both the first facing member 51 and the second facing member 52.

The first magnet 41, the second magnet 42, and the magnetic member 50 are fixed to the support 23. Specifically, the drive device 10 further includes a base 12, and the first magnet 41, the second magnet 42, the first facing member 51, the second facing member 52, and the support 23 are fixed to the base 12. The base 12 may be integrally formed with at least one of the first facing member 51 and the second facing member 52 and in this case, the base 12 may include a magnetic material. It is preferable that the base 12 faces a surface on a side opposite to a surface facing the facing member among the magnets. Then, the influence of the magnetic field to the outside can be reduced.

Further, the second movable portion 22 is swingably attached to the first movable portion 21. The second movable portion 22 is swingable with the first axis 222 as an axis such that an angle of a reference surface 221 is variable with respect to the first movable portion 21. That is, the second movable portion 22 is rotatable in a predetermined angle range with the first axis 222 as an axis. In the examples illustrated in FIG. 1 and FIGS. 2(a) to 2(d), the second movable portion 22 is connected to the first movable portion 21 by a connection portion 202. The connection portion 202 is provided at both ends of the second movable portion 22. Then, the first axis 222 passes through the connection portion 202 and coincides with the center line perpendicular to the long side of the first movable portion 21. Also, the first axis 222 is parallel to the y-direction.

On the other hand, the first movable portion 21 is swingable relative to the support 23 with the second axis 211 as an axis. That is, the first movable portion 21 is rotatable in a predetermined angle range with the second axis 211 as an axis. Here, the second axis 211 is perpendicular to the first axis 222. In the example illustrated in FIG. 1 and FIGS. 2(a) to 2(d), the first movable portion 21 is connected to the support 23 by the connection portion 201. The connection portion 201 is provided at both ends of the first movable portion 21. Then, the second axis 211 passes through the connection portion 201 and coincides with the center line perpendicular to the short side of the first movable portion 21. The second axis 211 is parallel to the x-direction.

In the drive device 10 according to this embodiment, even when the second movable portion 22 is enlarged, enlargement of a coil or a frame can be suppressed. Accordingly, high speed driving is possible, and heat generation of the coil can be suppressed.

In the examples illustrated in FIG. 1 and FIGS. 2(a) to 2(d), when the drive device 10 is viewed from the first direction, the second movable portion 22 is positioned at the center of the drive device 10 and the first magnet 41 is provided to overlap the second movable portion 22. Further, when viewed from the first direction, the first coil 31 surrounds the second movable portion 22, and the first magnet 41 is positioned inside the first coil 31. The magnetic member 50 is positioned on both sides of the second movable portion 22 in the x-direction, and the second magnet 42 is provided on both sides of each magnetic member 50 in the y-direction. The first movable portion 21, the second movable portion 22, the magnetic member 50, and the first magnet 41 are positioned inside the support 23, and the second magnet 42 is positioned outside the support 23. When viewed from a first direction, a structure of the drive device 10 is axisymmetric with the second axis 211 as a reference except for polarity of the second magnet 42, and is axisymmetric with the first axis 222 as a reference except for polarity of the first magnet 41.

In the examples illustrated in FIG. 1 and FIGS. 2(a) to 2(d), the drive device 10 includes a drive unit 20. The drive unit 20 includes the support 23, the first movable portion 21 and the second movable portion 22. In the drive unit 20, the first movable portion 21 and the second movable portion 22 are driven with respect to the support 23.

Figure 3:
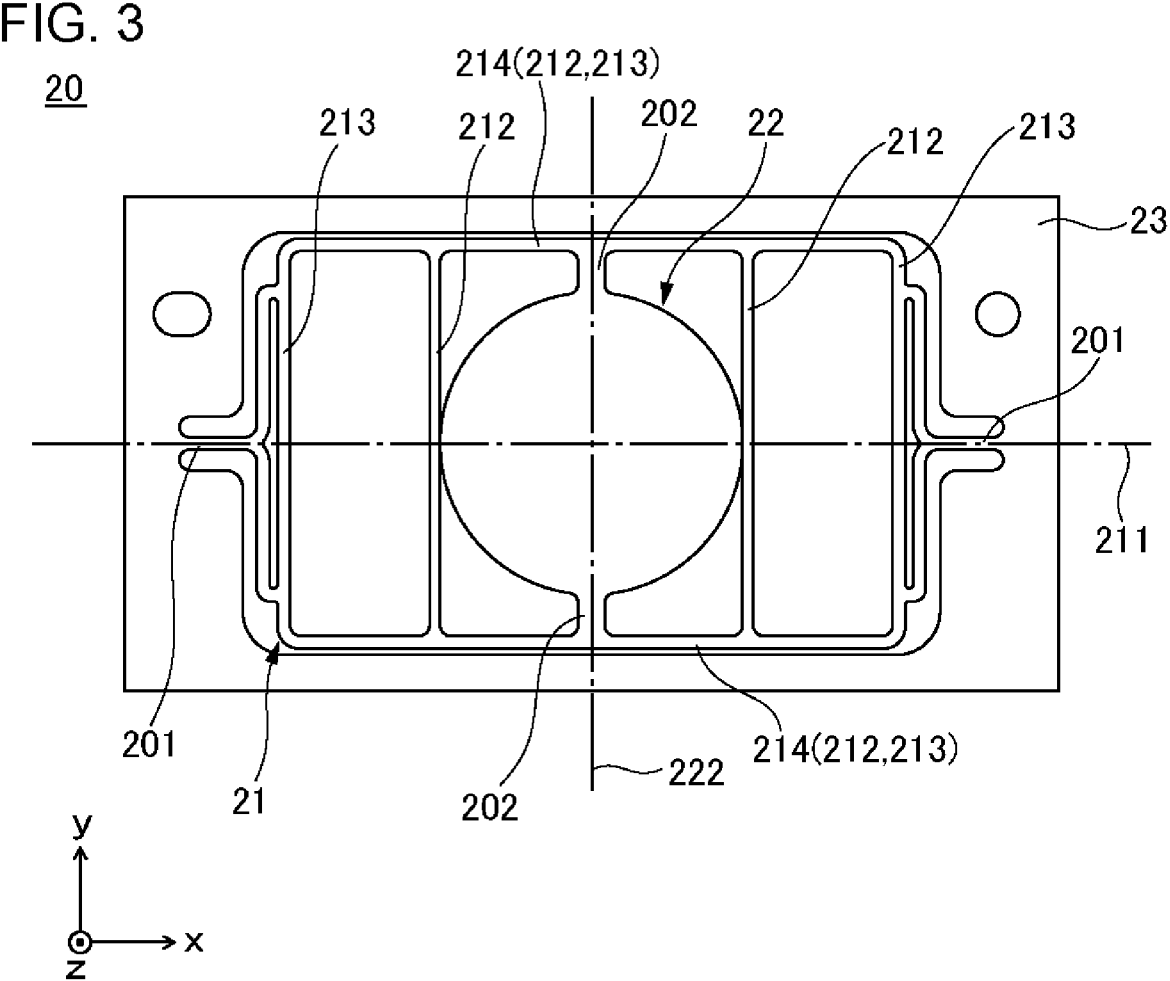
FIG. 3 is a plan view illustrating a structure of a drive unit.

FIG. 3 is a plan view illustrating a structure of the drive unit 20. The drive unit 20 has, for example, a MEMS structure, and can be obtained by microfabricating a material such as Si. The material such as Si is, for example, a silicon wafer. The drive unit 20 has, for example, a plate shape in which a part is hollowed out, and the thickness direction thereof coincides with the z-direction. When the drive unit 20 has a plate shape, the thickness is equal to or more than 0.05 mm and equal to or less than 0.3 mm, for example.

In the drive unit 20, the first movable portion 21, the second movable portion 22, and the support 23 are integrally formed. Specifically, the support 23 has a frame shape, and the first movable portion 21 is connected to the inside of the support 23 through the connection portion 201. The first movable portion 21 includes a first loop portion 212 and a second loop portion 213 larger than the first loop portion 212. Then, in the first movable portion 21, a sharing portion 214 which serves as both the first loop portion 212 and the second loop portion 213 is present. In the example of this figure, the second loop portion 213 is positioned outside the first loop portion 212, and the central axis of the second loop portion 213 coincides with the central axis of the first loop portion 212. The first loop portion 212 and the second loop portion 213 each function as a foundation of the coil.

Further, the first movable portion 21 is provided with an opening through which the magnetic member 50 passes. The opening is positioned between the first loop portion 212 and the second loop portion 213, in other words, is positioned outside the first loop portion 212 and inside the second loop portion 213.

The second movable portion 22 is connected to the inside of the first movable portion 21 through the connection portion 202. Specifically, the second movable portion 22 is provided inside the first loop portion 212 and the second loop portion 213, and the connection portion 202 connects the sharing portion 214 and the second movable portion 22. In the example of this figure, the second movable portion 22 is circular when viewed from the z-direction, and the central axes of the first loop portion 212 and the second loop portion 213 pass through the center of the second movable portion 22. The diameter of the second movable portion 22 is, for example, equal to or more than 1 mm and equal to or less than 10 mm. However, the shape, size, and position of the second movable portion 22 are not limited to this example. For example, the second movable portion 22 may be rectangular or polygonal. In the examples illustrated in FIG. 1 and FIGS. 2(a) to 2(d), the connection portion 202 is not provided with a conductor wire of coil or the like. Accordingly smooth swinging of the second movable portion 22 is possible.

Referring back to FIG. 1 and FIGS. 2(a) to 2(d), the structure of the drive device 10 will be further described. As described above, the drive device 10 includes the first magnet 41 and the second magnet 42. The first magnet 41 and the second magnet 42 may be magnets of different types, or may be magnets of the same type. Each of the first magnet 41 and the second magnet 42 may be a permanent magnet or an electromagnet. Examples of permanent magnets include a ferrite magnet, a neodymium magnet, a samarium cobalt magnet, and an alnico magnet. The magnet may be a bonded magnet containing rubber or resin. Above all, the first magnet 41 and the second magnet 42 are preferably neodymium magnets in view of the height of magnetic flux density.

In the examples illustrated in FIG. 1 and FIGS. 2(a) to 2(d), the first magnet 41 overlaps the second movable portion 22 when viewed from the first direction. The S pole and the N pole are aligned in the x-direction on a surface 411 of the first magnet 41 on the first coil 31 side. Two surfaces perpendicular to the x-direction of the surface 411 face the first facing member 51, respectively. Further, at least a part of the first movable portion 21 has a frame shape, and the first magnet 41 is positioned inside the first movable portion 21.

Further, when viewed from the first direction, the second magnet 42 is positioned outside the first movable portion 21. The drive device 10 includes four second magnets 42, and two of which form each pair and face each other through the second coil 32 and the second facing member 52. Here, the second magnets 42 of each pair face different poles. On the other hand, a plurality of the pairs of second magnets 42 are aligned in the x-direction. Then, the same poles of the second magnets 42 adjacent in the x-direction are directed to the second coil 32.

As described above, the drive device 10 includes the first facing member 51 and the second facing member 52. The first facing member 51 and the second facing member 52 each contains a magnetic material. The materials of the first facing member 51 and the second facing member 52 may be the same as or different from each other. Examples of the magnetic material include iron, nickel, cobalt, and alloy containing at least one of these materials.

The facing member is a magnet or a yoke. The magnet may be a permanent magnet or an electromagnet. Examples of the permanent magnet include a ferrite magnet, a neodymium magnet, a samarium cobalt magnet, and an alnico magnet. The magnet may be a bonded magnet containing rubber or resin. Examples of the material of the yoke include iron and steel. The material of the first facing member 51 and the material of the second facing member 52 may be the same as or different from each other. In this embodiment, the magnetic member 50 is a yoke.

The first magnet 41 and the first facing member 51 form a pair to generate a magnetic flux between the first magnet 41 and the first facing member 51. That is, the first magnet 41 and the first facing member 51 constitute a first magnetic circuit. The first coil 31 traverses magnetic flux generated between the first magnet 41 and the first facing member 51. The second magnet 42 and the second facing member 52 form a pair to generate a magnetic flux between the second magnet 42 and the second facing member 52. That is, the second magnet 42 and the second facing member 52 constitute a second magnetic circuit different from the first magnetic circuit. The second coil 32 traverses magnetic flux generated between the second magnet 42 and the second facing member 52.

In the examples illustrated in FIG. 1 and FIGS. 2(a) to 2(d), the first facing member 51 faces the first magnet 41, and the second facing member 52 faces the second magnet 42. The first facing member 51 also serves as the second facing member 52 and is positioned outside the first coil 31 and inside the second coil 32. Specifically, the drive device 10 includes the magnetic member 50, and the magnetic member 50 functions as both the first facing member 51 and the second facing member 52. The magnetic member 50 penetrates through the opening of the first movable portion 21. The magnetic member 50 may be integral with the base 12 or may be a member different from the base 12.

Apart of the support 23 is sandwiched between the second facing member 52 and the second magnet 42 when viewed from at least one of the first direction and the direction perpendicular to the first direction. In the examples illustrated in FIG. 1 and FIGS. 2(a) to 2(d), a part of the support 23 is sandwiched between the second facing member 52 and the second magnet 42 when viewed from the z-direction and the x-direction. Further, although the magnetic member 50 is inserted into the opening of the first movable portion 21, there is a gap between the first movable portion 21 and the magnetic member 50 to such an extent that the first movable portion 21 does not contact the magnetic member 50 even when the first movable portion 21 swings with the second axis 211 as a reference. Even when the first movable portion 21 swings with the first axis 222 as a reference, there is a gap between the first movable portion 21 and the magnetic member 50 to such an extent that the first movable portion 21 does not contact the magnetic member 50.

As described above, the drive device 10 includes the first coil 31 and the second coil 32. The first coil 31 and the second coil 32 form different loops. The current flows in the first coil 31 and the second coil 32 and as a result, a current loop fixed to the first movable portion 21 is formed. In each of the first coil 31 and the second coil 32, the number of turns of the coil is not particularly limited. Both the first coil 31 and the second coil 32 may be configured by one conductor wire, and the first coil 31 and the second coil 32 may be configured by mutually different conductor wires. In the examples illustrated in FIG. 1 and FIGS. 2(a) to 2 (d), the first coil 31 and the second coil 32 are positioned in the same plane.

At least a part of the first coil 31 passes between the first magnet 41 and the first facing member 51. That is, the first coil 31 passes through the magnetic field generated between the first magnet 41 and the first facing member 51. Further, at least a part of the second coil 32 passes between the second magnet 42 and the second facing member 52. That is, the second coil 32 passes through the magnetic field generated between the second magnet 42 and the second facing member 52. In the examples illustrated in FIG. 1 and FIGS. 2 (a) to 2 (d), the first coil 31 forms a current loop indicated by $\alpha_2$ in FIG. 2 (a), and the second coil 32 forms a current loop indicated by $\alpha_1$ in FIG. 2 (a). A portion of the first coil 31 passing between the first magnet 41 and the first facing member 51 is parallel to the y-direction, and a portion of the second coil 32 passing between the second magnet 42 and the second facing member 52 is parallel to the x-direction. In the portion where the first coil 31 and the second coil 32 overlap when viewed from the z-direction, any of the first coil 31 nor the second coil 32 does not pass between the first magnet 41 and the first facing member 51 and between the second magnet 42 and the second facing member 52.

In the examples illustrated in FIG. 1 and FIGS. 2 (a) to 2 (d), the first coil 31 is formed of a conductor wire along the first loop portion 212 of the first movable portion 21 and the second coil 32 is formed of a conductor wire along the second loop portion 213 of the first movable portion 21. That is, the central axis of the first coil 31 and the central axis of the second coil 32 coincide with each other. The portion of the first coil 31 passing between the first magnet 41 and the magnetic member 50, that is, the portion passing between the first magnet 41 and the first facing member 51 is positioned inside the second coil 32 when viewed from the first direction. Further, the second movable portion 22 is positioned inside the first coil 31 when viewed from the first direction.

In the examples illustrated in FIG. 1 and FIGS. 2(a) to 2(d), although the first coil 31 and the second coil 32 are fixed on the opposite side to the first magnet 41 with the first movable portion 21 as a reference, the fixed position with respect to the first movable portion 21 is not limited to this example.

Hereinafter, a drive principle of the drive device 10 will be described with reference to FIGS. 4 to 9.

Figure 4:
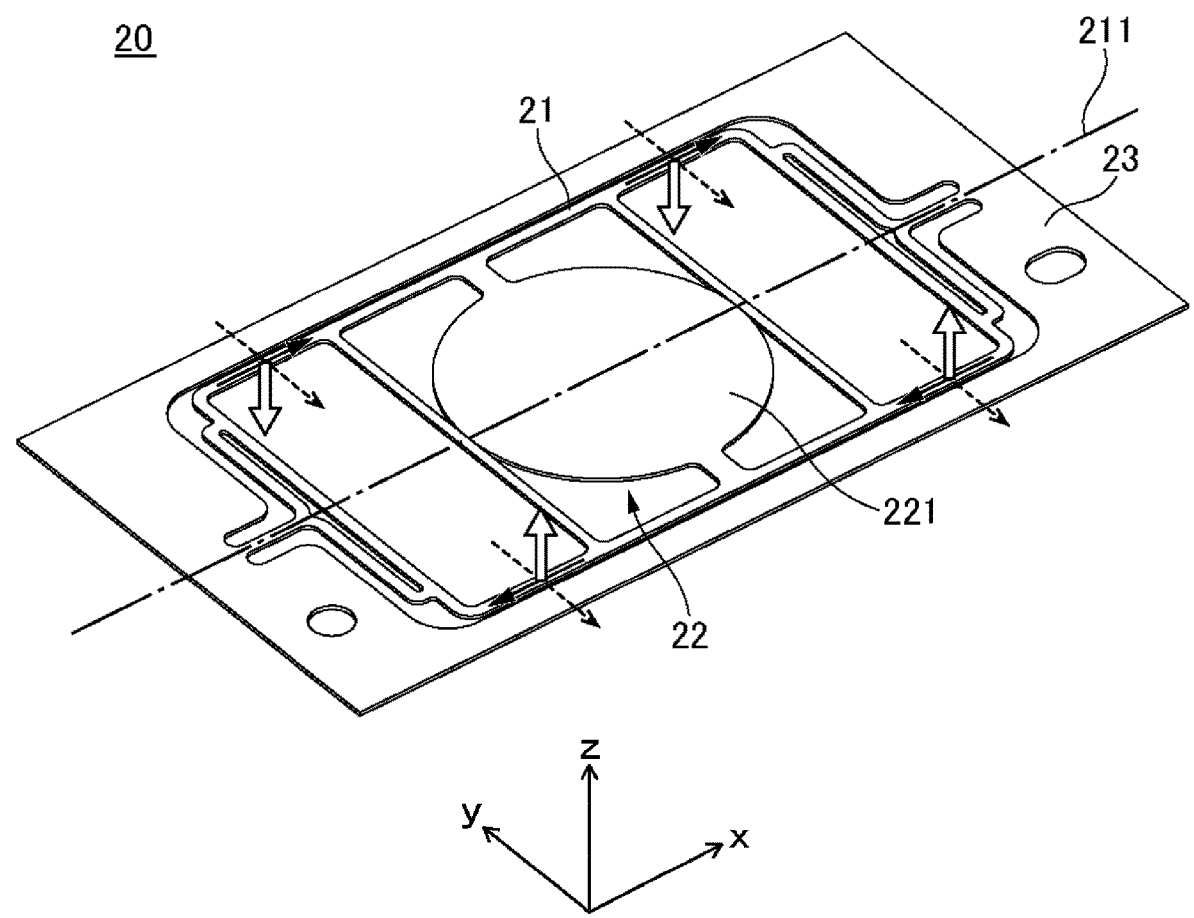
FIG. 4 is a view for explaining a drive force generated in a first movable portion with a second axis as an axis.

FIG. 4 is a view for explaining the drive force generated in the first movable portion 21 with the second axis 211 as an axis. In this figure, the current flowing through the second coil 32 is illustrated by a black arrow, the magnetic field applied to the second coil 32 is illustrated by a dashed arrow, and the force generated in the second coil 32 is illustrated by a white arrow. The directions of the current and the magnetic field may be opposite to those in this example, or may be switched as necessary.

In the portion of the second coil 32 passing between the second magnet 42 and the second facing member 52, the current flows in the second coil 32 in a direction parallel to the x-direction, and a magnetic field generated by the second magnet 42 and the second facing member 52 acts on the second coil 32. Here, in the portion passing between the second magnet 42 and the second facing member 52, the magnetic field between the second magnet 42 and the second facing member 52 includes at least a component in a direction parallel to the y-direction. As a result, a force in a direction parallel to the z-direction is generated in the second coil 32. Here, the direction of the generated force is axially symmetrical with respect to the second axis 211.

In this embodiment, although the configuration in which the second coil 32 passes between the second magnet 42 and the second facing member 52 when viewed from the first direction is described, if a magnetic field component in a direction parallel to the y-direction can be applied to the second coil 32, the second coil 32 may not necessarily pass between the second magnet 42 and the second facing member 52 when viewed from the first direction.

Figure 5:
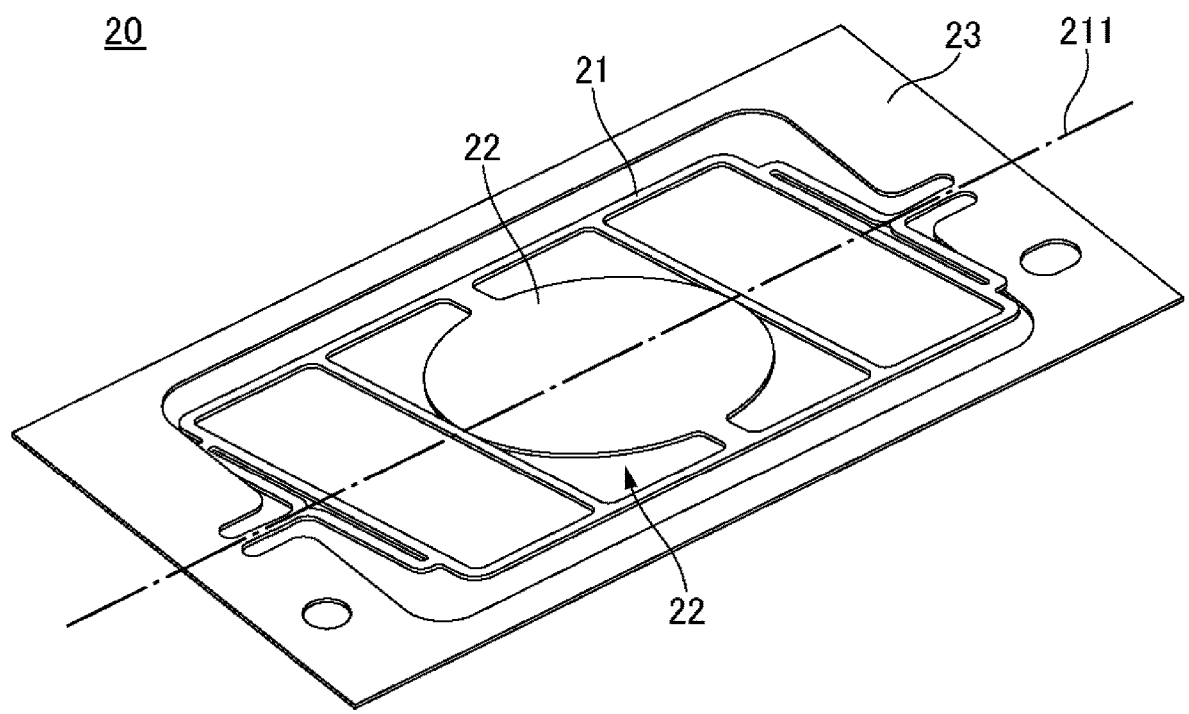
FIG. 5 is a view illustrating a state in which the first movable portion is swinging with the second axis as an axis.

FIG. 5 is a view illustrating a state in which the first movable portion 21 is swinging with the second axis 211 as an axis. Since the second coil 32 is fixed to the first movable portion 21, the first movable portion 21 is driven with the second axis 211 as an axis by the force generated in the second coil 32. At the same time, the second movable portion 22 is driven with the second axis 211 as an axis. Here, motion of the first movable portion 21 and motion of the second movable portion 22 with the second axis 211 as an axis occur substantially equally. The drive direction of the first movable portion 21 can be switched according to the direction of the current flowing through the second coil 32, and a drive amount of the first movable portion 21 can be controlled by adjusting magnitude of the current flowing through the second coil 32. A pattern of the current flowing through the second coil 32 is not particularly limited, but a triangular current, for example, flows through the second coil 32. A current of non-resonance frequency of vibration (rotation) of the first movable portion 21 with respect to the second axis 211 may flow through the second coil 32. The current flowing through the second coil 32 is not limited to the triangular wave, and may be a rectangular wave, a sine wave, a saw-tooth wave or the like, or a switchable DC current.

Figure 6:
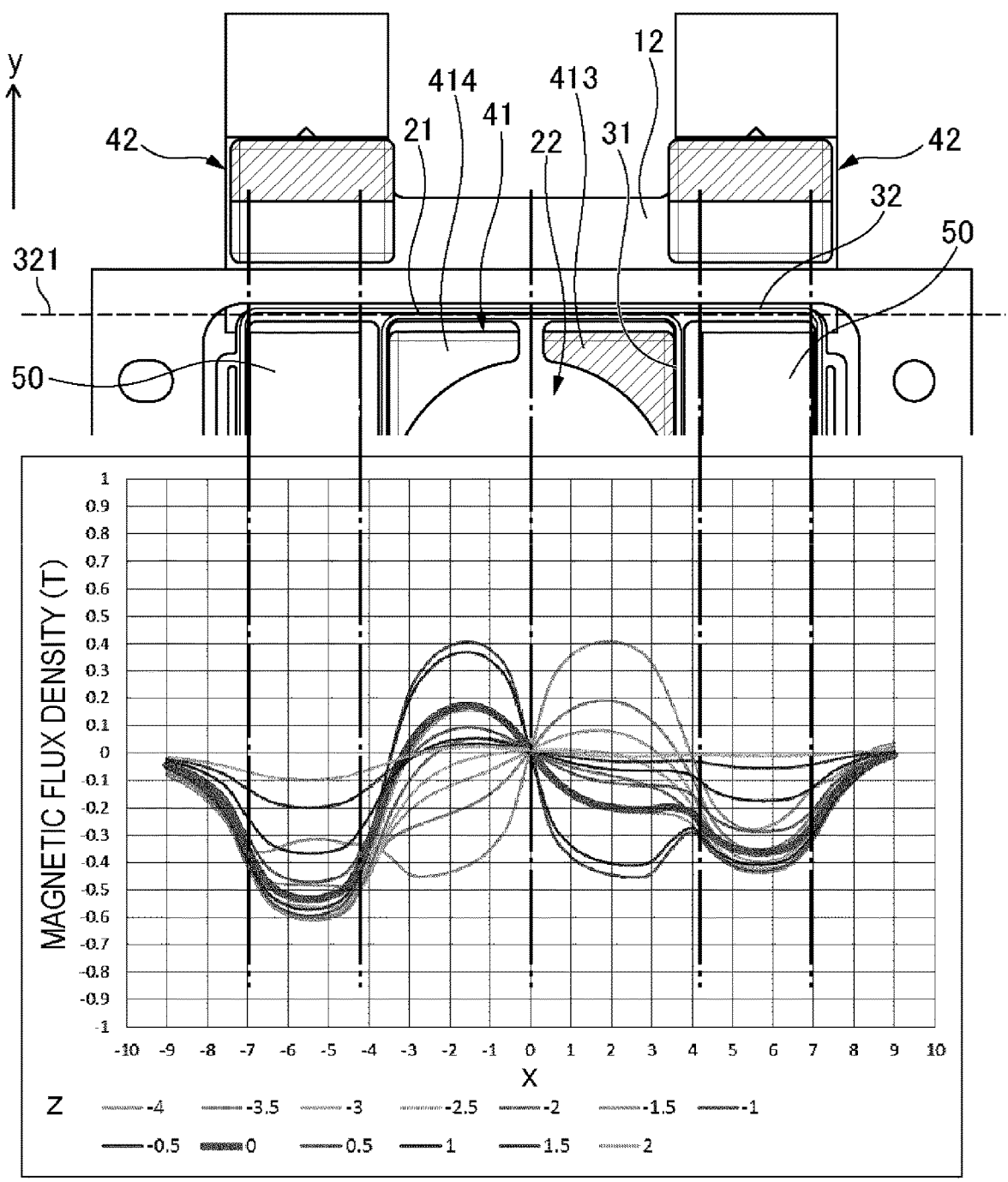
FIG. 6 is a view illustrating a simulation result of a magnetic field which acts on a second coil of the drive device.

FIG. 6 is a view illustrating a simulation result of a magnetic field which acts on the second coil 32 of the drive device 10. In this figure, the result obtained by modeling the drive device 10 illustrated in the examples illustrated in FIG. 1 and FIGS. 2(a) to 2(d) is illustrated. In this figure, a part of the plan view of the drive device 10 is illustrated at the upper part, and a graph of magnetic flux density generated for the second coil 32 at the position of a broken line 321 in this plan view is illustrated at the lower part. In magnetic flux density in this graph, density of the y-direction component of magnetic flux generated by the first magnet 41, the second magnet 42, and the magnetic member 50 is indicated for a plurality of z-coordinates. The height of the second coil 32 is z=0.

In the drive device 10 illustrated in the examples illustrated in FIG. 1 and FIGS. 2 (a) to 2 (d), the N pole and the S pole are aligned on the surface of the first magnet 41 on the first coil 31 side. That is, in the surface 411 of the first magnet 41, area 413 and area 414 have different polarities. As illustrated in this figure, magnetic flux is laterally asymmetrical with respect to the center line of the first movable portion 21. This asymmetry is due to asymmetry of the poles of the first magnet 41. However, it can be said that the sum of magnetic flux is sufficiently equal on the left and right. Accordingly, in the drive device 10, the first movable portion 21 can be driven substantially symmetrically with respect to the first axis 222.

Figure 7:
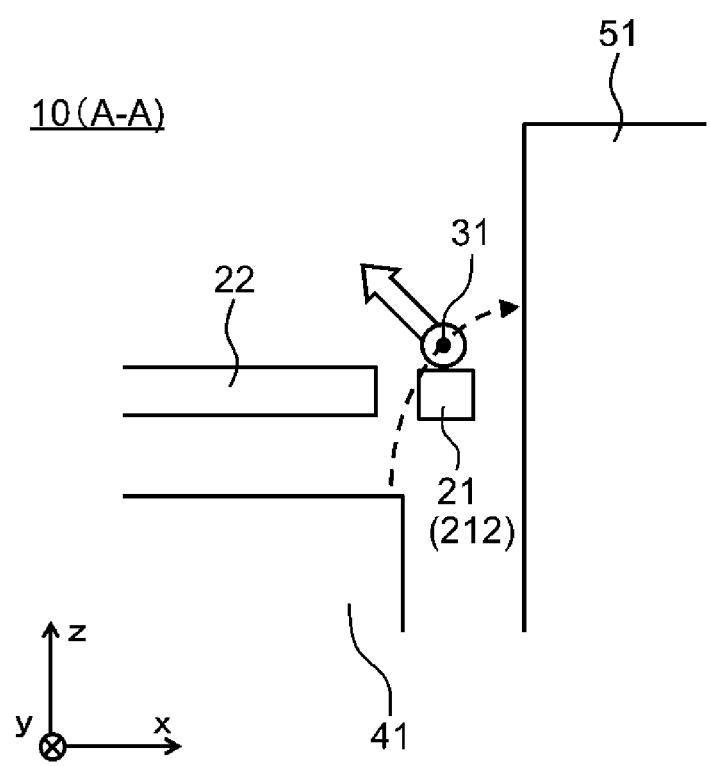
FIG. 7 is a view for explaining the drive force generated in the first movable portion with a first axis as an axis.

FIG. 7 is a view for explaining the drive force generated in the first movable portion 21 with the first axis 222 as an axis. This figure corresponds to a cross section taken along line A-A in FIG. 2 (a). In this figure, the magnetic field applied to the first coil 31 is illustrated by a dashed arrow, and the force generated in the first coil 31 is illustrated by a white arrow. It is assumed that the current of the first coil 31 is flowing from the back to the front of this figure. The directions of the current and the magnetic field may be opposite to those in this example, or may be switched as necessary.

In the example of this figure, the first coil 31 is at a position deviated from the first magnet 41 in the z-direction. However, magnetic flux directing from the first magnet 41 toward the first facing member 51 also spreads to the first coil 31 side of the first magnet 41. Accordingly magnetic flux by the first magnet 41 and the first facing member 51 acts on the first coil 31. In the examples illustrated in FIG. 1 and FIGS. 2(a) to 2 (d), polarity of the surface 412 of the first magnet 41 opposite to the first coil 31 side is inverted from polarity of the surface 411 of the first coil 31 side. Accordingly, more lines of magnetic flux from the first magnet 41 spreads to the first coil 31 side to act on the first coil 31, and a large drive force can be generated.

In the portion of the first coil 31 passing between the first magnet 41 and the first facing member 51 when viewed from the z-direction, the current flows through the first coil 31 in a direction parallel to the y-direction, and a magnetic field generated by the first magnet 41 and the first facing members 51 acts on the first coil 31. Here, in a portion where the first coil 31 passes between the first magnet 41 and the first facing member 51, the magnetic field between the first magnet 41 and the first facing member 51 includes at least a component in a direction parallel to the x-direction. As a result, a force is generated in the first coil 31 at least in the direction parallel to the z-direction. In the example of this figure, the magnetic field acting on the first coil 31 between the first magnet 41 and the first facing member 51 further includes a component parallel to the z-direction. Accordingly, in the first coil 31, a force in a direction parallel to the x-direction is also generated, and as a whole, a force in a direction inclined to the z-direction is generated.

In this embodiment, although the configuration in which the first coil 31 passes between the first magnet 41 and the first facing member 51 when viewed from the first direction is described, the first coil 31 may not pass between the first magnet 41 and the first facing member 51 when viewed from the first direction as long as magnetic field components in directions parallel to the X-direction can be applied to the first coil 31.

In the drive device 10 exemplified in FIG. 1 and FIGS. 2(a) to 2(d), the first coil 31 passes between the first magnet 41 and the first facing member 51 at two points. The direction of the force generated at each point is axially symmetrical with respect to the first axis 222.

Figure 8:
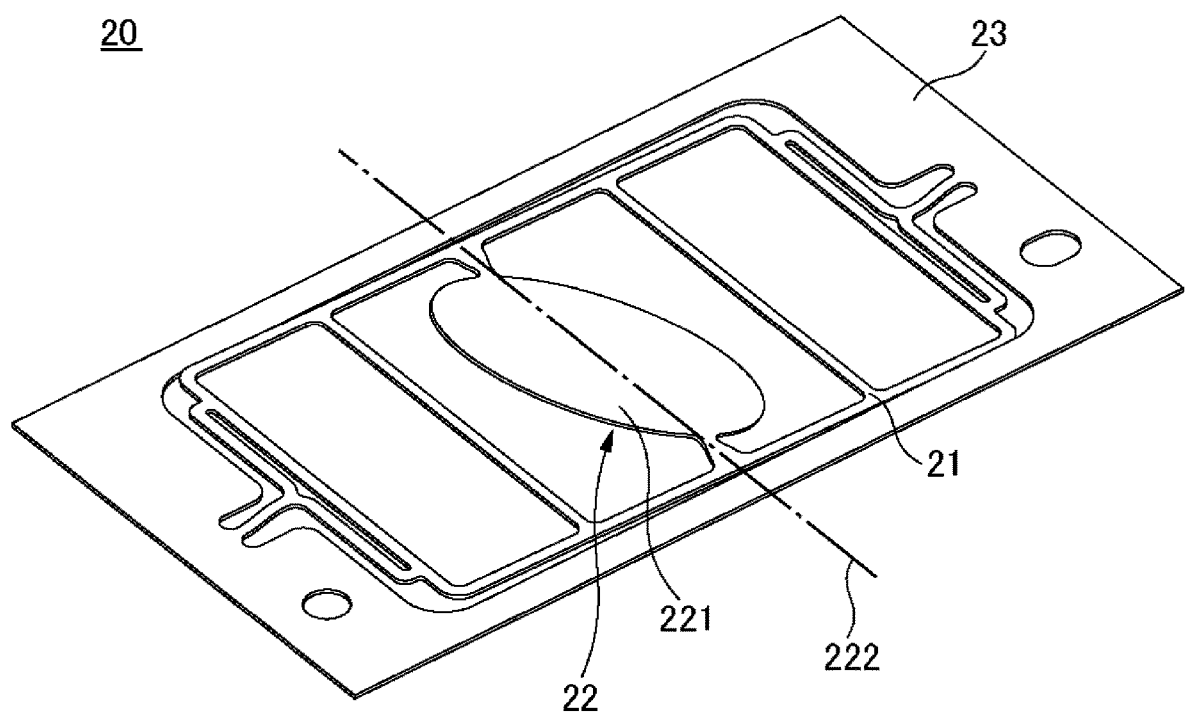
FIG. 8 is a view illustrating a state in which a second movable portion is swinging with the first axis as an axis.

FIG. 8 is a view illustrating a state in which the second movable portion 22 swings with the first axis 222 as an axis. Since the first coil 31 is fixed to the first movable portion 21, the first movable portion 21 is driven with the first axis 222 as an axis by a force generated in the first coil 31. Then, the second movable portion 22 swings in response to the drive of the first movable portion 21. Swing amplitude of the second movable portion 22 can be larger than the swing amplitude of the first movable portion 21. The drive direction of the first movable portion 21, that is, the drive direction of the second movable portion 22 can be switched according to the direction of the current flowing through the first coil 31, and the magnitude of drive of the first movable portion 21, that is, the swing amplitude of the second movable portion 22 can be controlled by adjusting the magnitude of the current flowing through the first coil 31. Although the pattern of the current flowing through the first coil 31 is not particularly limited, it is preferable that an alternating current having a frequency close to the resonance frequency of vibration (rotation) of the second movable portion 22 with respect to the first axis 222 flows through the first coil 31. Then, the second movable portion 22 can be driven with high efficiency. Although the alternating current is not particularly limited, examples thereof include a rectangular wave, a sine wave, a triangular wave, and the like. The frequency close to the resonance frequency is, for example, a frequency of equal to or more than 0.8 $f_{r2}$ and equal to or less than 1.2 $f_{r2}$ when the resonance frequency is $f_{r2}$.

Figure 9:
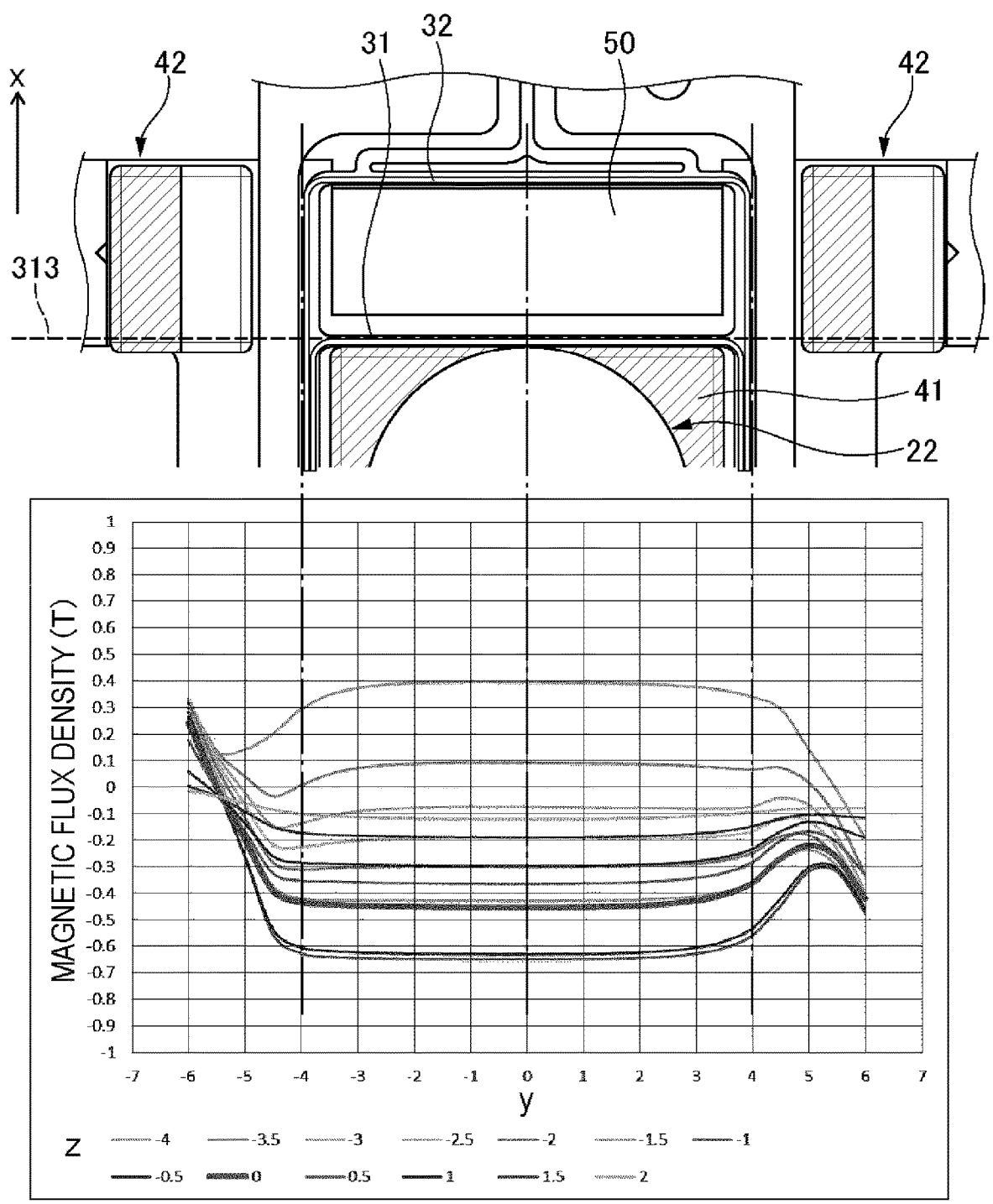
FIG. 9 is a view illustrating a simulation result of a magnetic field which acts on a first coil of the drive device.

FIG. 9 is a view illustrating a simulation result of the magnetic field which acts on the first coil 31 of the drive device 10. In this figure, the result obtained by modeling the drive device 10 illustrated in the examples illustrated in FIG. 1 and FIGS. 2(a) to 2(d) is illustrated. In this figure, a part of the plan view of the drive device 10 is illustrated at the upper part, and a graph of magnetic flux density generated for the first coil 31 at the position of a broken line 313 in this plan view is illustrated at the lower part. In magnetic flux density in this graph, density of the x-direction component of magnetic flux generated by the first magnet 41, the second magnet 42, and the magnetic member 50 is indicated for a plurality of z-coordinates. The height of the first coil 31 is z=0.

As illustrated in this figure, magnetic flux density is substantially constant at a portion where the first coil 31 passes between the first facing member 51 and the first magnet 41. Accordingly, in the drive device 10, the first movable portion 21 can be driven substantially symmetrically with respect to the second axis 211.

Specifically, it is preferable that $|\Delta B/B_{ave}|$ is equal to or more than 0.1 and equal to or less than 0.5 when an average value of magnetic flux density of the x-direction component of the portion where the first coil 31 passes between the first facing member 51 and the first magnet 41 is set as $B_{ave}$ and the difference between the maximum value and the minimum value of the magnetic flux density is set as $\Delta B$.

In the drive device 10 of this embodiment, since the first coil 31 does not pass between the second magnet 42 and the second facing member 52, most of the current flowing through the first coil 31 acts only on the drive of the first movable portion 21 with the first axis 222 as the axis. That is, crosstalk due to the current flowing through the first coil 31 with respect to the drive of the first movable portion 21 with the second axis 211 as an axis is very small.

On the other hand, in the drive device 10 of this embodiment, since the second coil 32 does not pass between the first magnet 41 and the first facing member 51, most of the current flowing through the second coil 32 acts only on the drive of the first movable portion 21 with the second axis 211 as an axis. That is, crosstalk due to the current flowing through the second coil 32 with respect to the drive of the first movable portion 21 with the first axis 222 as an axis is very small. In particular, even when the resonant frequencies of singing in two axial directions are close to each other, problems due to crosstalk can be avoided.

The first coil 31 does not need to be positioned between the first magnet 41 and the first facing member 51 when viewed from the y-direction. That is, the first coil 31 may be deviated from the first magnet 41 in the z-direction. However, it is preferable that the first coil 31 passes through an area where the x-direction component of magnetic flux is large. Specifically, examples of the state in which the first coil 31 passes through the area where the x-direction component of magnetic flux is large include a state as in the following first example or second example.

In the first example, a peak value of magnetic flux density of the component of magnetic flux emitted from the first magnet 41 toward the first facing member 51 is set as $B_{s1}$. Then, in a state when no current flows through the first coil 31 and the second coil 32, the first coil 31 passes through an area where the magnitude of magnetic flux density directed from the first magnet 41 toward the first facing member 51 is equal to or more than $B_{s1} \times 0.6$ and equal to or less than $B_{s1} \times 1$.

Figure 10:
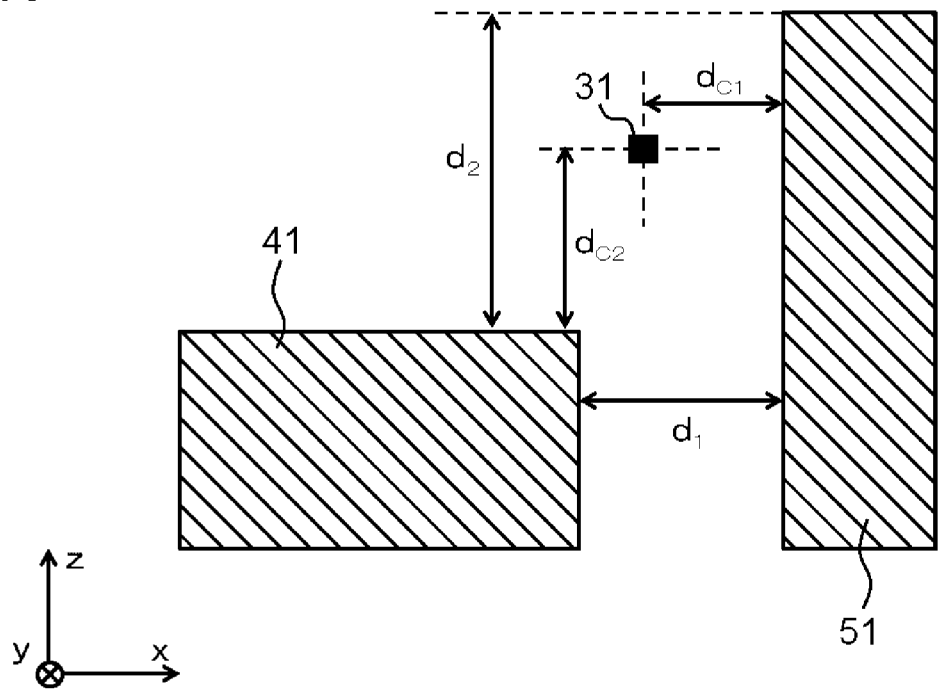
FIG. 10 is a view illustrating a second example of a state in which the first coil passes through an area where the x-direction component of magnetic flux is large.

FIG. 10 is a view illustrating a second example of the state where the first coil 31 passes through an area where the x-direction component of magnetic flux is large. This figure illustrates a cross section perpendicular to the y-direction of a portion where the first coil 31 passes between the first magnet 41 and the first facing member 51 when viewed from the z-direction. In this figure, only the first coil 31, the first magnet 41, and the first facing member 51 are drawn. It is assumed that polarity of the surface of the first magnet 41 on the side opposite to the first coil 31 is inverted from polarity of the surface of the first coil 31 side, and magnetic flux from the first magnet 41 mainly extends in the z-direction. It is assumed that an end portion of the first facing member 51 is deviated from an end portion of the first magnet 41 in the z-direction. It is assumed that the distance between the end portion of the first magnet 41 and the end of the first facing member 51 in the x-direction is $d_1$, and the distance between the end portion of the first magnet 41 and the end portion of the first facing member 51 in the z-direction is $d_2$. Further, it is assumed that the distance between the end portion of the first facing member 51 and the central axis of the first coil 31 in the x-direction is $d_{C1}$, and the distance between the end portion of the first magnet 41 and the central axis of the first coil 31 in the z-direction is $d_{C2}$. Here, each end portion is an end portion (for example, an end face) closest to the first coil 31 in each direction. In the second example, in a state where no current flows through the first coil 31 and the second coil 32, the first coil 31 is in a position where $d_1 \times 0.3 \leq d_{C1} \leq d_1 \times 0.7$ and $d_2 \times 0.3 \leq d_{C2} \leq d_2 \times 0.7$.

Further, the second coil 32 does not necessarily need to be positioned between the second magnet 42 and the second facing member 52 when viewed from the x-direction. However, it is preferable that the second coil 32 passes through an area where the y-direction component of magnetic flux is large. Similarly as in the case of the first coil 31, the following first example and second example may be included as the state where the second coil 32 passes through the area where the y-direction component of magnetic flux is large.

In the first example, the peak value of magnetic flux density of the component of magnetic flux emitted from the second magnet 42 toward the second facing member 52 is set as $B_{s2}$. Then, in a state in which no current flows through the first coil 31 and the second coil 32, the second coil 32 passes through an area where the magnitude of magnetic flux density directed from the second magnet 42 toward the second facing member 52 is equal to or more than $B_{s2} \times 0.6$ and equal to or less than $B_{s2} \times 1$.

Figure 11:
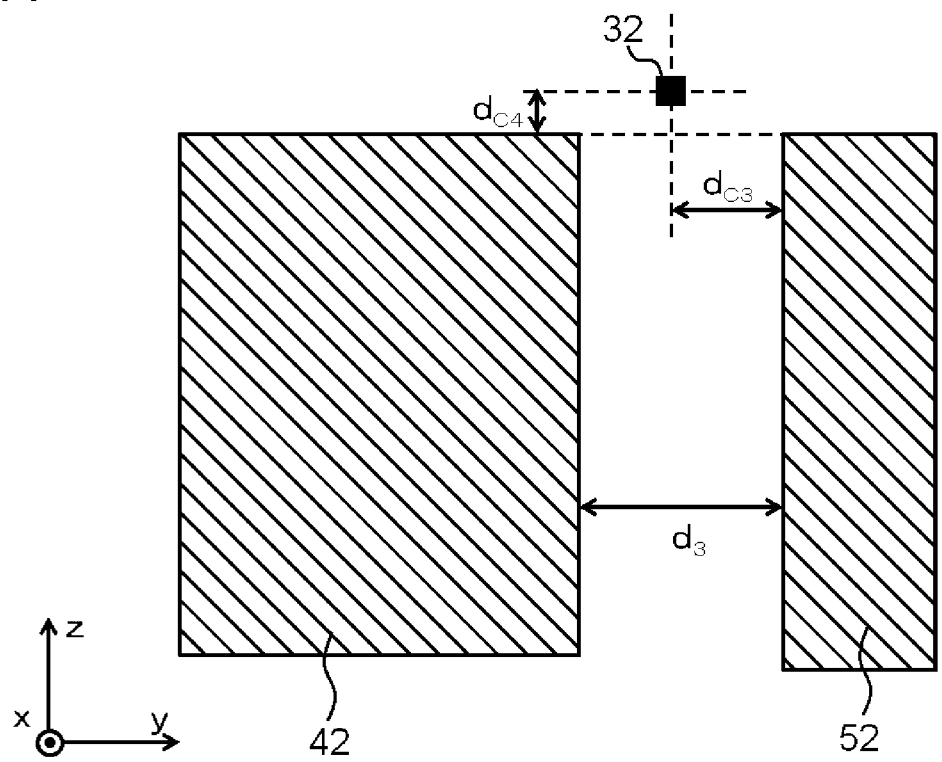
FIG. 11 is a view illustrating a second example of a state in which the second coil passes through an area where the y-direction component of magnetic flux is large.

FIG. 11 is a view illustrating a second example of the state in which the second coil 32 passes through the area where the y-direction component of magnetic flux is large. The figure illustrates a cross section perpendicular to the x-direction of a portion where the second coil 32 passes between the second magnet 42 and the second facing member 52 when viewed from the z-direction. In this figure, only the second coil 32, the second magnet 42, and second facing member 52 are rendered. It is assumed that polarity of the surface of the second magnet 42 on the side opposite to the second coil 32 is inverted from polarity of the surface of the second coil 32 side and magnetic flux from second magnet 42 mainly extends in the y-direction. It is assumed that the end portion of the first facing member 51 is not substantially deviated from the end of the first magnet 41 in the z-direction. In this example, in a state where no current flows through the first coil 31 and the second coil 32, the second coil 32 is positioned between the second magnet 42 and the second facing member 52 when viewed from the x-direction or the second coil 32 is in a position where $d_3 \times 0.3 \leq d_{C3} \leq d_3 \times 0.7$ and $d_{C4} \leq d_3 \times 0.3$. Here, it is assumed that the distance between the end portion of the second magnet 42 and the end portion of the second facing member 52 in the y-direction is $d_3$. It is assumed that the distance between the end portion of the second facing member 52 and the central axis of the second coil 32 in the y-direction is $d_{C3}$, and the distance between the end of the second magnet 42 and the central axis of the second coil 32 in the z-direction is $d_{C4}$. Here, each end portion is an end portion (for example, an end face) closest to the second coil 32 in each direction.

A fact that the first coil 31 does not pass between the second magnet 42 and the second facing member 52 when viewed from the first direction means that the first coil 31 does not cross between the second magnet 42 and the second facing member 52 when viewed from the first direction. A fact that the second coil 32 does not pass between the first magnet 41 and the first facing member 51 when viewed from the first direction means that the second coil 32 does not cross between the first magnet 41 and the first facing member 51 when viewed from the first direction.

In this embodiment, although an example in which the drive device 10 includes one first coil 31 and one second coil 32 is described, the drive device 10 may include a plurality of at least one of the first coil 31 and the second coil 32. For example, the drive device 10 may include two second coils 32 surrounding the two magnetic members 50, respectively. In this case, each second coil 32 passes between the second facing member 52 and the second magnet 42, but does not pass between the first magnet 41 and the first facing member 51. Specifically, magnetic flux between the first magnet 41 and the first facing member 51 hardly acts on the second coil 32 by disposing the position of the conductor wire of the second coil 32 on the first magnet side to be deviated sufficiently in the z-direction or the x-direction. Furthermore, the directions of the current flowing through the two second coils 32 can be controlled independently of each other. Here, in a case where the directions of the current flowing through the two second coils 32 are opposite to each other when viewed from the first direction, the two second magnets 42 adjacent to each other in the x-direction may have different poles directed to the second coil 32.

As described above, according to this embodiment, magnetic flux from the first magnet 41 acts on the first coil 31. Magnetic flux from the second magnet 42 acts on the second coil 32. As such, the magnetic circuits different from each other act on the first coil 31 and the second coil 32, thereby capable of achieving miniaturization of the drive device 10 for two-axis drive. In addition, mutual interference in drive in two directions with different axes is reduced.

Example 1

Figure 12:
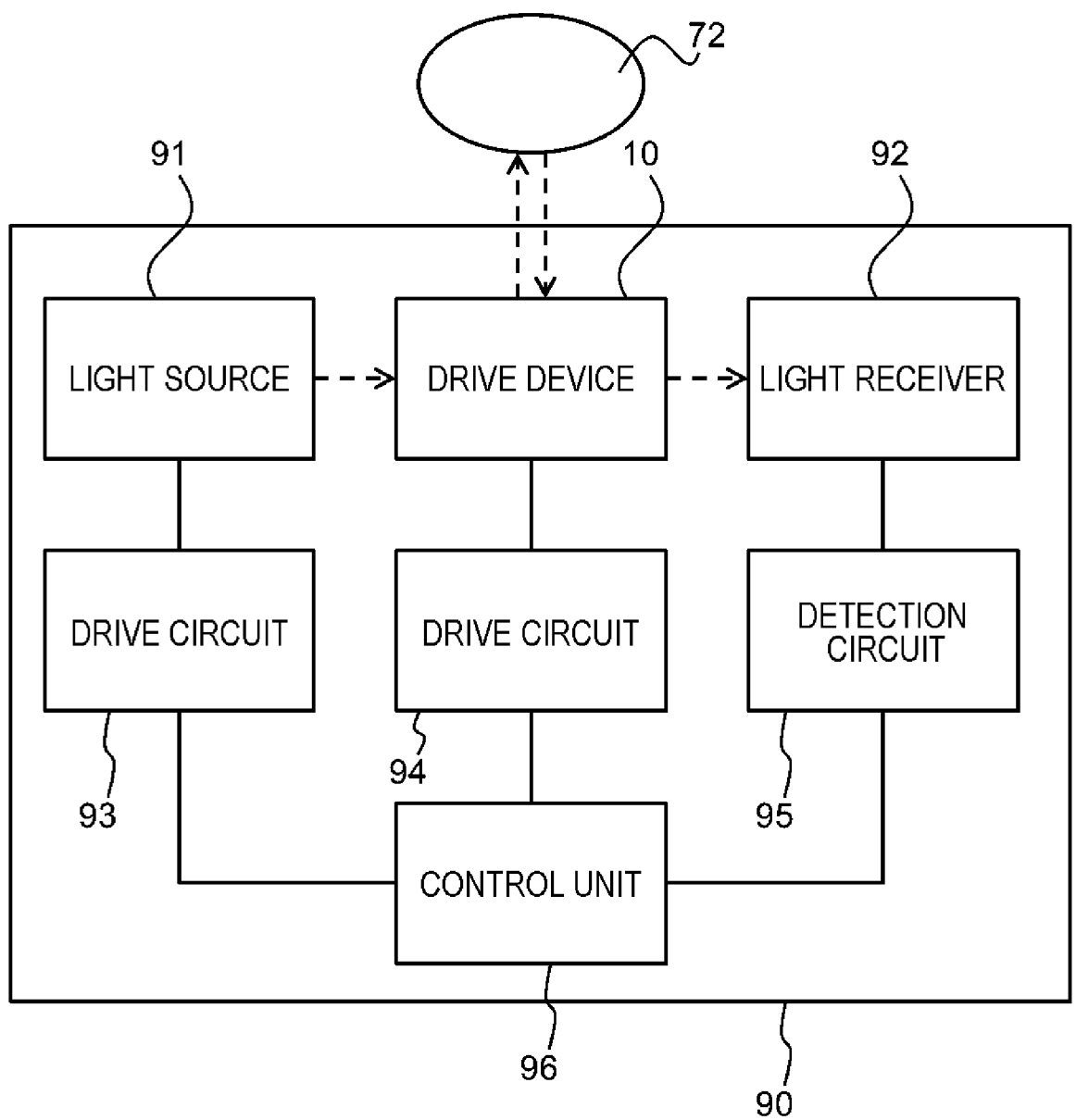
FIG. 12 is a block diagram illustrating a configuration of a distance measurement apparatus according to Example 1.

FIG. 12 is a block diagram illustrating a configuration of a distance measurement apparatus 90 according to Example 1. In the figure, for lines connecting blocks, a signal path is indicated by a solid line and a path of light is indicated by a broken line. The distance measurement apparatus 90 according to this example includes the drive device 10. The drive device 10 of this example has the same configuration as the drive device 10 according to the embodiment.

In this example, the drive device 10 is mounted on the distance measurement apparatus 90 that emits light, and the drive device 10 changes a light emitting direction of light from the distance measurement apparatus 90.

More specifically, the second movable portion 22 includes a mirror whose reference surface 221 is a reflection surface. Then, the emission direction of light from the distance measurement apparatus 90 can be changed in two axial directions by emitting the light through the mirror driven by the drive device 10.

The distance measurement apparatus 90 is a measurement apparatus that emits light to the object 72, receives reflected light, and measures the distance to an object 72. Specifically, in the distance measurement apparatus 90, for example, the distance from the distance measurement apparatus 90 to the object 72 is calculated based on the difference between emission timing of light and light reception timing of the reflected light. The light is, for example, infrared light. However, a wavelength of light is not particularly limited and may be visible light.

The distance measurement apparatus 90 includes a light source 91, a light receiver 92, a drive circuit 93 for the light source 91, a drive circuit 94 for the drive device 10, a detection circuit 95, and a control unit 96.

The light source 91 is, for example, a laser diode. Light output from the light source 91 is, for example, pulsed light. Light output from the light source 91 of the distance measurement apparatus 90 is emitted through a light exit port of the distance measurement apparatus 90 through the mirror of the drive device 10. The light emitted from the distance measurement apparatus 90 is reflected by the external object 72, and at least a portion of the light returns toward the distance measurement apparatus 90. Then, the light returned to the distance measurement apparatus 90 is guided to the light receiver 92 again through the mirror of the drive device 10 and detected by the light receiver 92. Here, in the distance measurement apparatus 90, the time from when light is emitted from the light source 91 to when the reflected light is detected by the light receiver 92 is measured. Then, the distance between the distance measurement apparatus 90 and the object 72 is calculated using the measured time and a propagation speed of light. The distance measurement apparatus 90 is, for example, a LIDAR (Laser Imaging Detection and Ranging, Laser Illuminated Detection and Ranging) apparatus or LiDAR (Light Detection and Ranging) apparatus, a radar device or the like.

Figure 13:
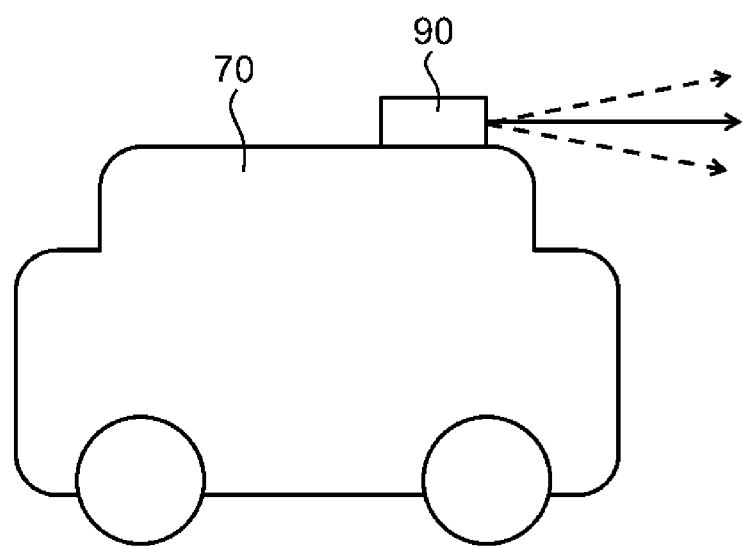
FIG. 13 is a view illustrating a use environment of the distance measurement apparatus.

FIG. 13 is a diagram illustrating a use environment of the distance measurement apparatus 90. The distance measurement apparatus 90 can be mounted on, for example, a moving body 70. The moving body 70 is, for example, a vehicle such as a car or a train.

Referring back to FIG. 12, the configuration of the distance measurement apparatus 90 will be described in detail. The light receiver 92 is, for example, a light receiving element such as a photodiode. The drive circuit 93 is a drive circuit for the light source 91. The drive circuit 93 inputs a drive signal for outputting light to the light source 91 based on control by the control unit 96. The drive circuit 94 is a drive circuit for the drive device 10. The drive circuit 94 inputs a drive signal to the drive device 10 based on control by the control unit 96. That is, the drive circuit 94 applies current to the first coil 31 and the second coil 32 of the drive device 10 based on the control by the control unit 96. The drive device 10 changes the emission direction of the light from the distance measurement apparatus 90 based on the drive signal.

In the distance measurement apparatus 90, for example, the light source 91 repeatedly emits pulsed light. Then, the drive device 10 is controlled so as to scan a predetermined range with light by changing the light emitting direction in two axial directions. By doing as described above, the object 72 existing around the distance measurement apparatus 90 can be detected.

The detection circuit 95 is a detection circuit for the light receiver 92. The detection circuit 95 can be configured to include, for example, a current-voltage conversion circuit and an amplification circuit. For example, when the light receiver 92 is a photodiode, the current generated by light incident on the light receiver 92 is converted by the detection circuit 95 into a detection signal.

The control unit 96 controls the drive circuit 93 and the drive circuit 94, and further processes the detection signal from the detection circuit 95 to realize distance measurement. That is, the control unit 96 calculates the distance between the distance measurement apparatus 90 and the object 72 using the time from when light is emitted from the light source 91 to when the reflected light is detected by the light receiver 92 and the propagation speed of light. Specifically, the control unit 96 transmits a trigger signal indicating the output timing of the light source 91 to the drive circuit 93. The control unit 96 also receives a signal indicating the light reception timing from the detection circuit 95 of the light receiver 92. Then, the control unit 96 measures the time from the output timing to the light reception timing based on the transmission and reception timing of each signal. Next, the control unit 96 calculates the distance between the distance measurement apparatus 90 and the object 72 using the measured time and the propagation speed of light. Information indicating the propagation speed of light can be read from, for example, a storage device 808 to be described later and used by the control unit 96.

When the distance measurement apparatus 90 is mounted on the moving body 70, the calculated distance between the distance measurement apparatus 90 and the object 72 is linked with the light emitting direction based on the drive signal of the drive device 10, and can be used for driving assistance of the moving body 70, automatic driving, and the like.

Figure 14:
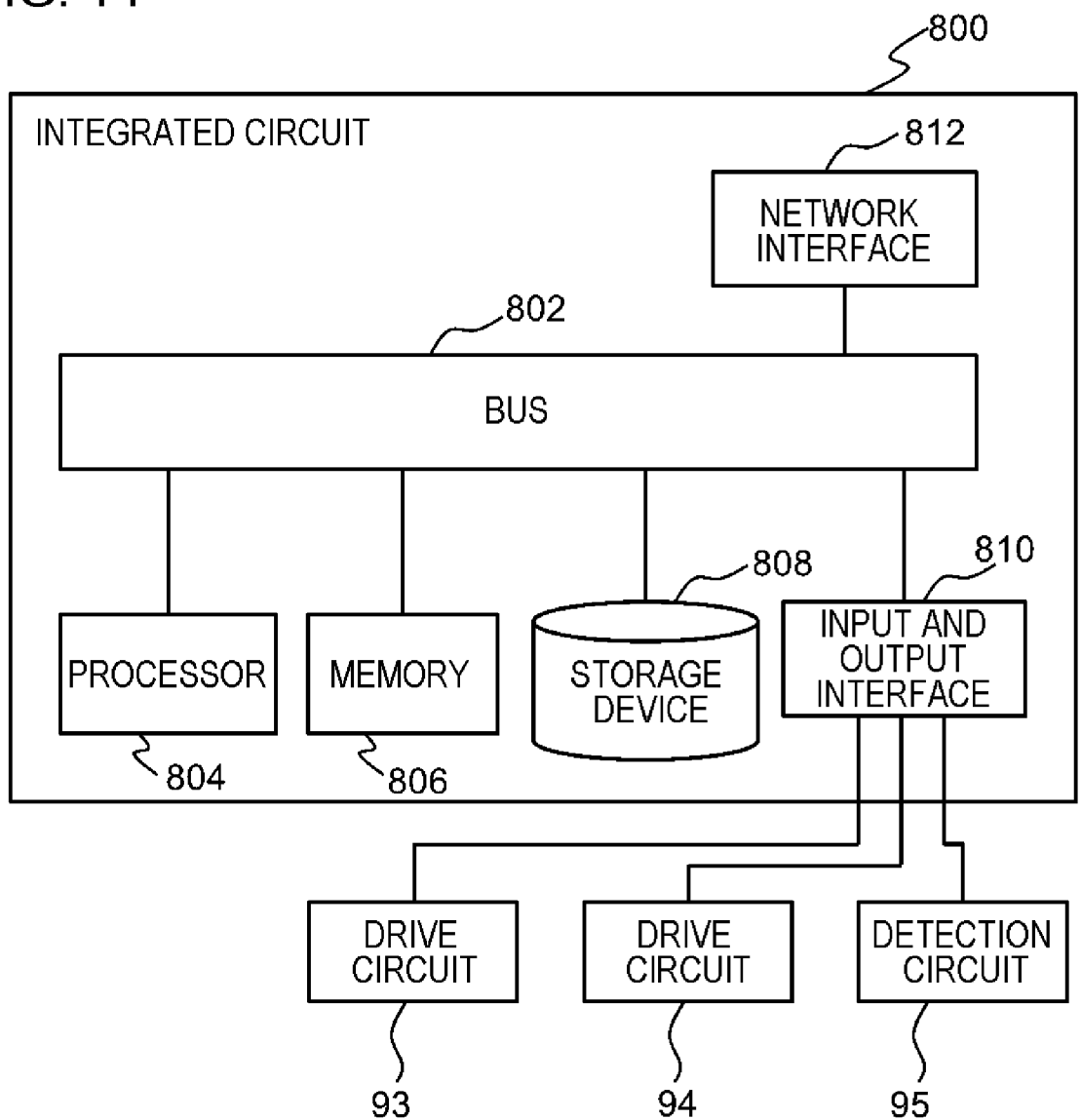
FIG. 14 is a diagram illustrating a hardware configuration of a control unit.

FIG. 14 is a diagram illustrating a hardware configuration of the control unit 96. In the figure, the control unit 96 is implemented using an integrated circuit 800. The integrated circuit 800 is, for example, a system on chip (SoC).

The integrated circuit 800 includes a bus 802, a processor 804, a memory 806, a storage device 808, an input and output interface 810, and a network interface 812. The bus 802 is a data transmission path for the processor 804, the memory 806, the storage device 808, the input and output interface 810, and the network interface 812 to mutually transmit and receive data. However, a method of connecting the processors 804 and the like to one another is not limited to connection through the bus. The processor 804 is an operation processing unit realized using a microprocessor or the like. The memory 806 is a memory realized using a random access memory (RAM) or the like. The storage device 808 is a storage device realized using a read only memory (ROM), a flash memory, or the like.

The input and output interface 810 is an interface for connecting the integrated circuit 800 to peripheral devices. In this figure, the drive circuit 93 for the light source 91, the drive circuit 94 for the drive device 10, and the detection circuit 95 for the light receiver 92 are connected to the input and output interface 810.

The network interface 812 is an interface for connecting the integrated circuit 800 to a communication network. This communication network is, for example, a controller area network (CAN) communication network. The method of connecting the network interface 812 to the communication network may be wireless connection or wired connection.

The storage device 808 stores a program module for realizing the function of the control unit 96. The processor 804 realizes the function of the control unit 96 by reading the program module into the memory 806 and executing the program module.

The hardware configuration of the integrated circuit 800 is not limited to the configuration illustrated in this figure. For example, the program module may be stored in memory 806. In this case, the integrated circuit 800 may not include the storage device 808.

Figure 15:
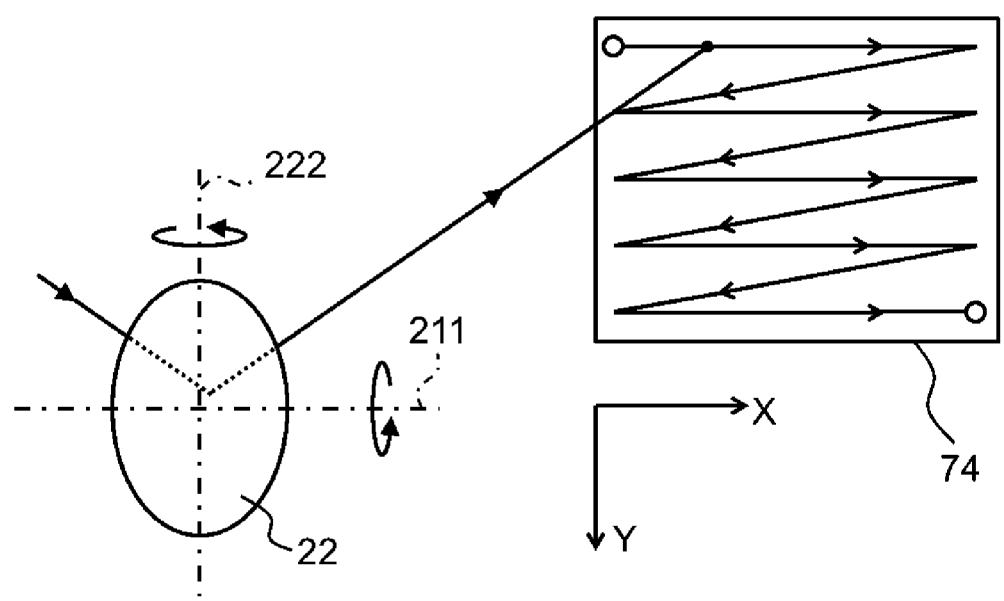
FIG. 15 is a view for explaining scanning by the drive device.

FIG. 15 is a diagram for explaining scanning by the drive device 10. The distance measurement apparatus 90 scans the surroundings with light to generate a frame. That is, the control unit 96 controls the drive device 10 through the drive circuit 94 to generate the frame. Specifically, for example, pulse light is repeatedly output while repeatedly changing the emission direction linearly in the X-direction in the figure, and the distance to the object is measured. At the same time, the emission direction is shifted by a predetermined width in the Y-direction perpendicular to the X-direction for each linear movement. By doing as described above, a rectangular area 74 can be scanned with light. A data set obtained by scanning the area 74 once is referred to as one frame. By scanning in this manner to acquire the direction and distance of an object around the distance measurement apparatus 90, three-dimensional information of the surrounding can be obtained. When the control unit 96 finishes scanning the area 74, the control unit 96 returns the emission direction to the first direction, and scans the area 74 again to generate the next frame. Thus, a plurality of frames are repeatedly generated.

Here, the movement of light in the X-direction in the frame is realized, for example, by vibration of the second movable portion 22 with the first axis 222 as an axis and the movement of light in the Y-direction is realized, for example, by motion of the second movable portion 22 with the second axis 211 as an axis. In the drive device 10 of this example, the frequency of motion of the second movable portion 22 with the first axis 222 as an axis is higher than the frequency of motion with the second axis 211 as an axis.

In the examples illustrated in FIG. 1 and FIGS. 2(*a*) to 2(*d*), the first movable portion 21 has a structure having a short-axis direction and a long-axis direction when viewed from the first direction, and the short-axis direction is parallel to the first axis 222, and the long-axis direction is parallel to the second axis 211. When the first coil 31 is rectangular when viewed from the first direction, for example, the short-axis direction is the short side direction of the first coil 31, and the long-axis direction is the long side direction of the first coil 31. Also, for example, when the first coil 31 is elliptical when viewed from the first direction, the short-axis direction is the short-axis direction of the ellipse, and the long-axis direction is the long-axis direction of the ellipse.

In the drive device 10, since it is not necessary to provide the movable portion which encloses a mirror in duplicate, a short-axis direction can be shortened near the size of a mirror. Further, by setting the short-axis direction to be parallel to the first axis 222 and the long-axis direction to be parallel to the second axis 211, inertia moment of swing of the first movable portion 21 with respect to the second axis 211 can be reduced. That is, even when the size of the mirror is increased, highly accurate drive around with the second axis 211 as an axis is possible.

On the other hand, when the drive device 10 is mounted on the moving body 70, it is preferable that a resonance frequency $f_{r1}$ of vibration of the first movable portion 21 with the second axis 211 as an axis is equal to or more than 500 Hz. Then, the problem that the first movable portion 21 is unintentionally shaken by disturbance caused by the vibration of the moving body 70 is less likely to occur.

The resonance frequency of the vibration of the first movable portion 21 with the second axis 211 as an axis is not particularly limited. As an example, assuming that the resonance frequency of the vibration of the first movable portion 21 with the second axis 211 as an axis is $f_{r1}$ and the resonance frequency of the vibration of the second movable portion 22 with the first axis 222 as an axis is $f_{r2}$, it is preferable that $f_{r1} < f_{r2}$ is established. Further, it is preferable that $f_{r1} \leq 1.5$ kHz is established.

As described above, according to this example, magnetic flux from the first magnet 41 acts on the first coil 31 similarly as in the embodiment. Magnetic flux from the second magnet 42 acts on the second coil 32. As such, the magnetic circuits different from each other act on the first coil 31 and the second coil 32, thereby capable of achieving miniaturization of the drive device 10 for two-axis drive. In addition, mutual interference is reduced in drive in two directions with different axes.

In addition, according to the distance measurement apparatus 90 provided with the drive device 10, stable scanning by light becomes possible.

Example 2

FIGS. 16 (a) and 16 (b) are views illustrating the method of forming the first coil 31 and the second coil 32 in Example 2, respectively. In this example, the first coil 31 and the second coil 32 are formed by winding around the same conductor wire. The drive device 10 according to this example has the same configuration as the drive device 10 according to at least one of the embodiment and Example 1, and the distance measurement apparatus 90 according to this example has the same configuration as the distance measurement apparatus 90 according to Example 1.

Both ends of the conductor wires constituting the first coil 31 and the second coil 32 are lead wires 300. The lead wire 300 is drawn out of the drive unit 20 along the connection portion 201 of the drive unit 20.

In this example, in the conductor wires constituting the first coil 31 and the second coil 32, a drive current which is a combination of a current signal $S_1$ for driving with respect to the first axis 222 and a current signal $S_2$ for driving with respect to the second axis 211 is applied. Specifically, for example, the current signal $S_1$ is a current signal having the resonance frequency $f_{r2}$ of swinging of the second movable portion 22 with respect to the first axis 222. The current signal $S_2$ is a current signal having a lower frequency $f_L$ that causes the first movable portion 21 to drive with respect to the second axis 211. A drive current obtained by adding these current signals flows to the conductor wire. Then, swinging of the second movable portion 22 with respect to the first axis 222 is greatly excited by the component of the resonance frequency $f_{r2}$ of the drive current. Further, the drive of the first movable portion 21 with respect to the second axis 211 is excited in response to the component of the frequency $f_L$. On the other hand, swinging of the second movable portion 22 with respect to the first axis 222 by the component of the frequency $f_L$ and driving of the first movable portion 21 with respect to the second axis 211 by the component of the resonance frequency $f_{r2}$ have sufficiently low responsiveness, respectively. Accordingly a desired drive state can be realized using the drive current obtained by adding the resonance frequency $f_{r2}$ and the frequency $f_L$. In the drive current, the current signal $S_1$ and the current signal $S_2$ are controlled independently of each other.

Figure 16A:
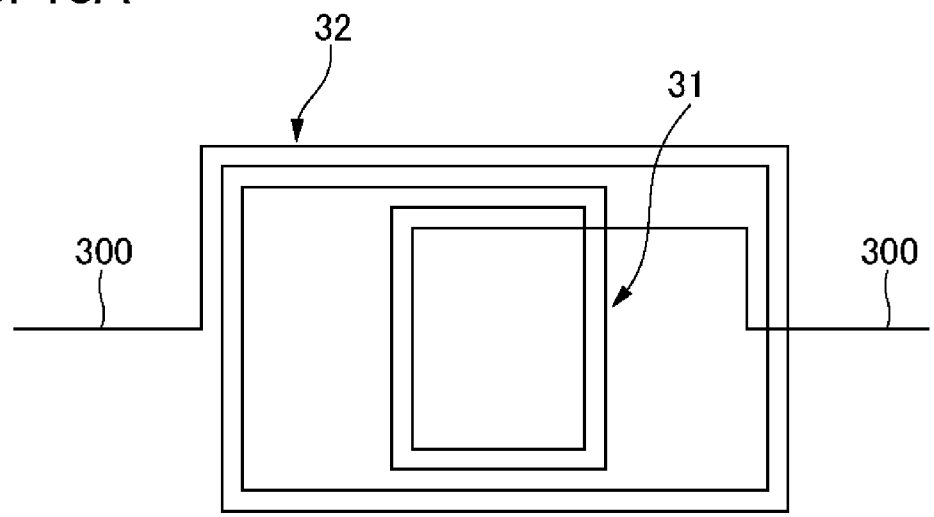
FIGS. 16(*a*) and 16(*b*) are views illustrating formation methods of a first coil and a second coil in Example 2, respectively.
Figure 16B:
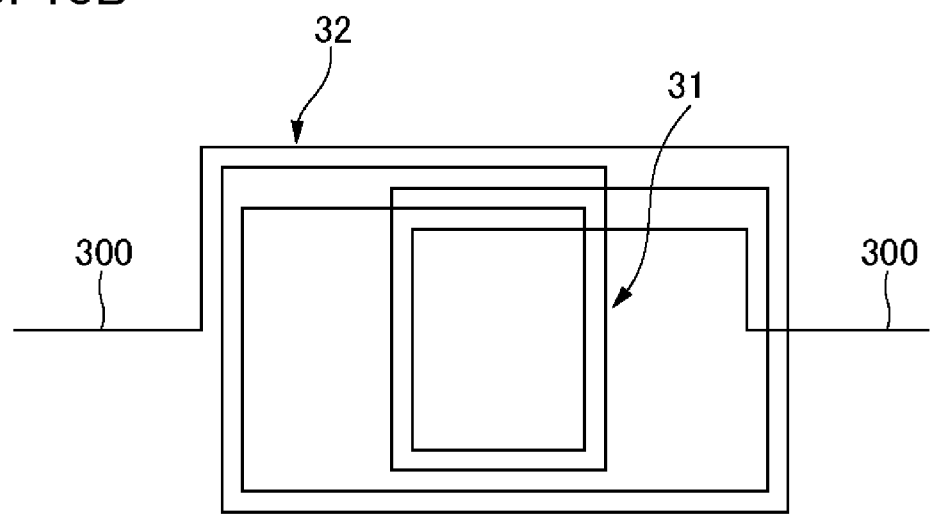

FIG. 16(a) is a first example of a method of winding around the conductor wire, and FIG. 16(b) is a second example of the method of winding around the conductor wire. In the first example, the first coil 31 and the second coil 32 are formed in order, and are electrically connected in series. On the other hand, in the second example, the first coil 31 and the second coil 32 are not in electrical series relation.

As described above, according to this example, magnetic flux from the first magnet 41 acts on the first coil 31 similarly as in the embodiment. Magnetic flux from the second magnet 42 acts on the second coil 32. As such, the magnetic circuits different from each other act on the first coil 31 and the second coil 32, thereby capable of achieving miniaturization of the drive device 10 for two-axis drive. Further, mutual interference is reduced in drive in two directions with different axes.

In addition, according to this example, the first coil 31 and the second coil 32 are formed by winding around the same conductor wire. Accordingly, the drive device 10 can be realized by simple wiring.

Example 3

Figure 17:
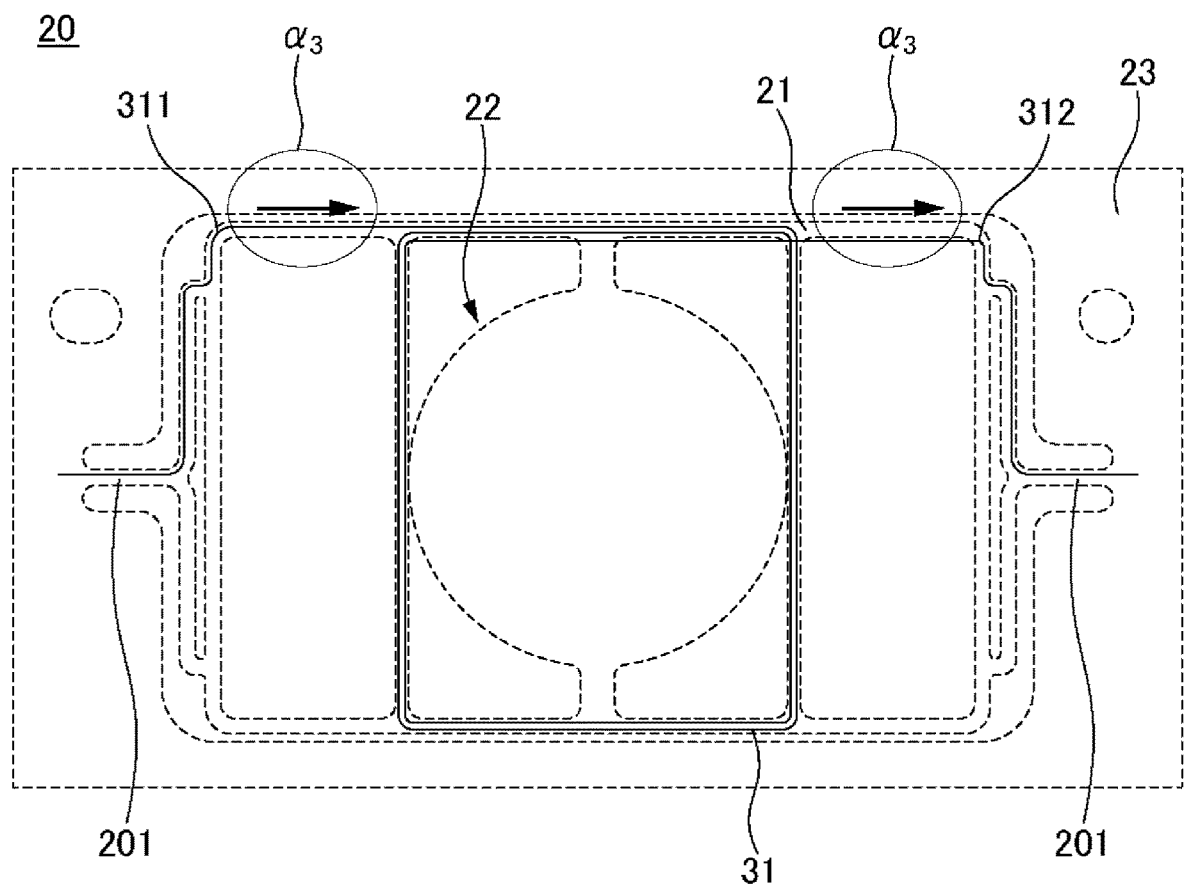
FIG. 17 is a view illustrating a first configuration example of a first coil according to Example 3.
Figure 18:
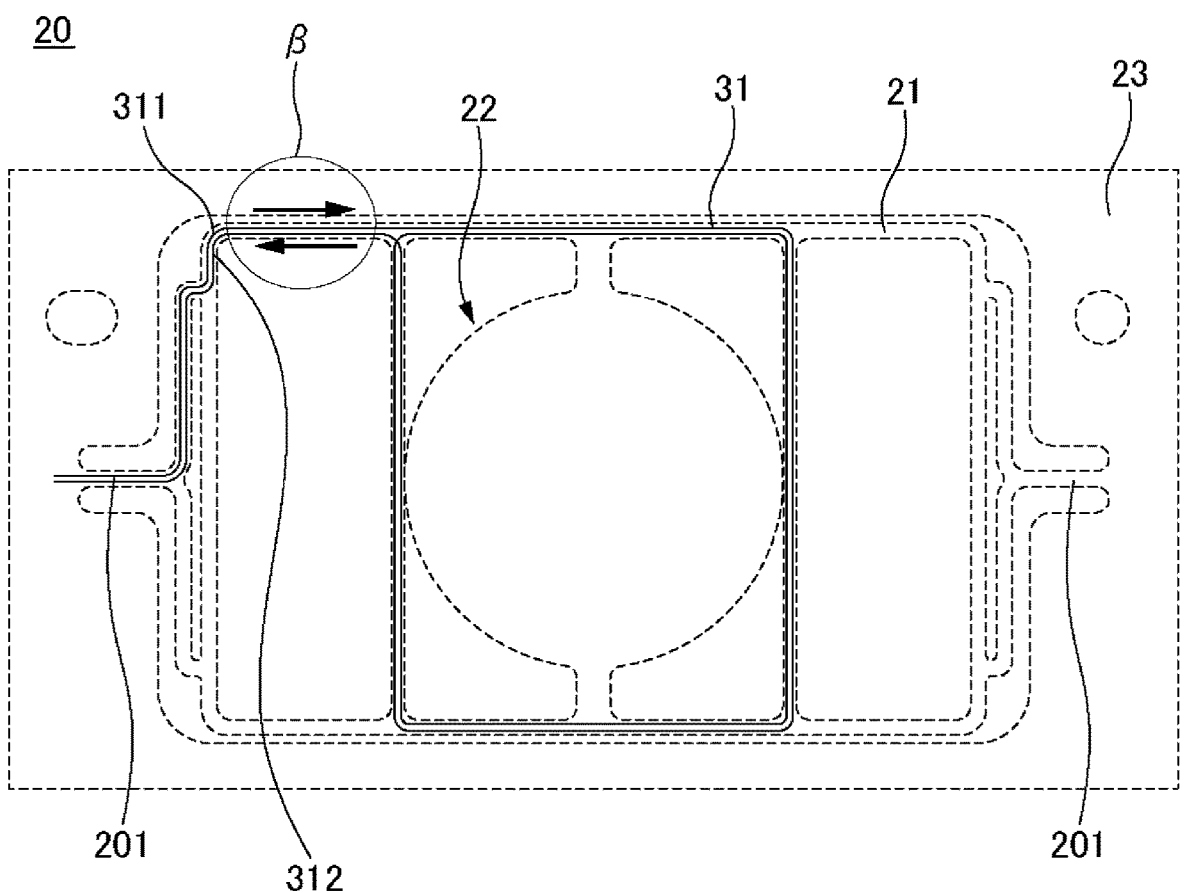
FIG. 18 is a view illustrating a second configuration example of the first coil according to Example 3.

FIG. 17 is a view illustrating a first configuration example of the first coil 31 according to Example 3, and FIG. 18 is a view illustrating a second configuration example of the first coil 31 according to Example 3. In FIG. 17 and FIG. 18, the drive unit 20 is indicated by a broken line, and the first coil 31 and its lead wire are indicated by a solid line.

In this example, the first coil 31 and the second coil 32 are formed by winding around the conductor wires different from each other. The second coil 32 is omitted in FIG. 17 and FIG. 18. The drive device 10 according to this example has the same configuration as the drive device 10 according to at least one of the embodiment and Example 1, and the distance measurement apparatus 90 according to this example has the same configuration as the distance measurement apparatus 90 according to Example 1.

In this example, the current signal $S_1$ for driving with respect to the first axis 222 is applied to the conductor wire constituting the first coil 31, and the current signal $S_2$ for driving with respect to the second axis 211 is applied to the conductor wire constituting the second coil 32. By doing as described above, drive with respect to the first axis 222 and drive with respect to the second axis 211 are controlled independently of each other by different wires. As the current signal $S_1$ and the current signal $S_2$, the same example as described in Example 2 may be included.

FIG. 17 is a view illustrating a first configuration example of the first coil 31. A first lead wire 311 and a second lead wire 312 are respectively connected to both electrical ends of the first coil 31. In this configuration example, the first lead wire 311 and the second lead wire 312 are taken out along the connection portions 201 different from each other. In this configuration example, the current signal $S_1$ to the first coil 31 passes between the second magnet 42 and the second facing member 52 in a portion indicated by $\alpha_3$ in this figure. However, the amount of current in the lead wire is very small as compared with a coil with multiple wires, and responsiveness to the current signal $S_1$ is also low for driving with respect to the second axis 211. Accordingly a desired drive state can be realized in this configuration example.

FIG. 18 is a view illustrating a second configuration example of the first coil 31. Also, in this example configuration example, the first lead wire 311 and the second lead wire 312 are respectively connected to the electrical ends of the first coil 31. However, in this configuration example, at least a part of the first lead wire 311 and at least a part of the second lead wire 312 are overlapped at a portion passing between the second magnet 42 and the magnetic member 50, that is, a portion passing between the second magnet 42 and the second facing member 52.

More specifically, in the example of this figure, the portion where the first lead wire 311 passes between the second magnet 42 and the second facing member 52, and the portion where the second lead wire 312 passes between the second magnet 42 and the second facing member 52 overlap. Further, the first lead wire 311 and the second lead wire 312 are taken out along the same connection portion 201.

As a result, in this configuration example, the current signal $S_1$ to the first coil 31 passes twice between the second magnet 42 and the second facing member 52 in the directions opposite to each other in the portion indicated by $\beta$ in this figure. That is, in the portion indicated by β, the force generated by the current in the first lead wire 311 and the force generated by the current in the second lead wire 312 are cancelled, and the influence of the lead wire is reduced.

As described above, according to this example, magnetic flux from the first magnet 41 acts on the first coil 31 similarly as in the embodiment. Magnetic flux from the second magnet 42 acts on the second coil 32. As such, the magnetic circuits different from each other act on the first coil 31 and the second coil 32, thereby capable of achieving miniaturization of the drive device 10 for two-axis drive. In addition, mutual interference in drive in two directions with different axes is reduced.

In addition, according to this example, the first coil 31 and the second coil 32 are formed by winding around different lead wires different from each other. Accordingly, the drive with respect to the first axis 222 and the drive with respect to the second axis 211 are controlled independently of each other.

Example 4

Figure 19:
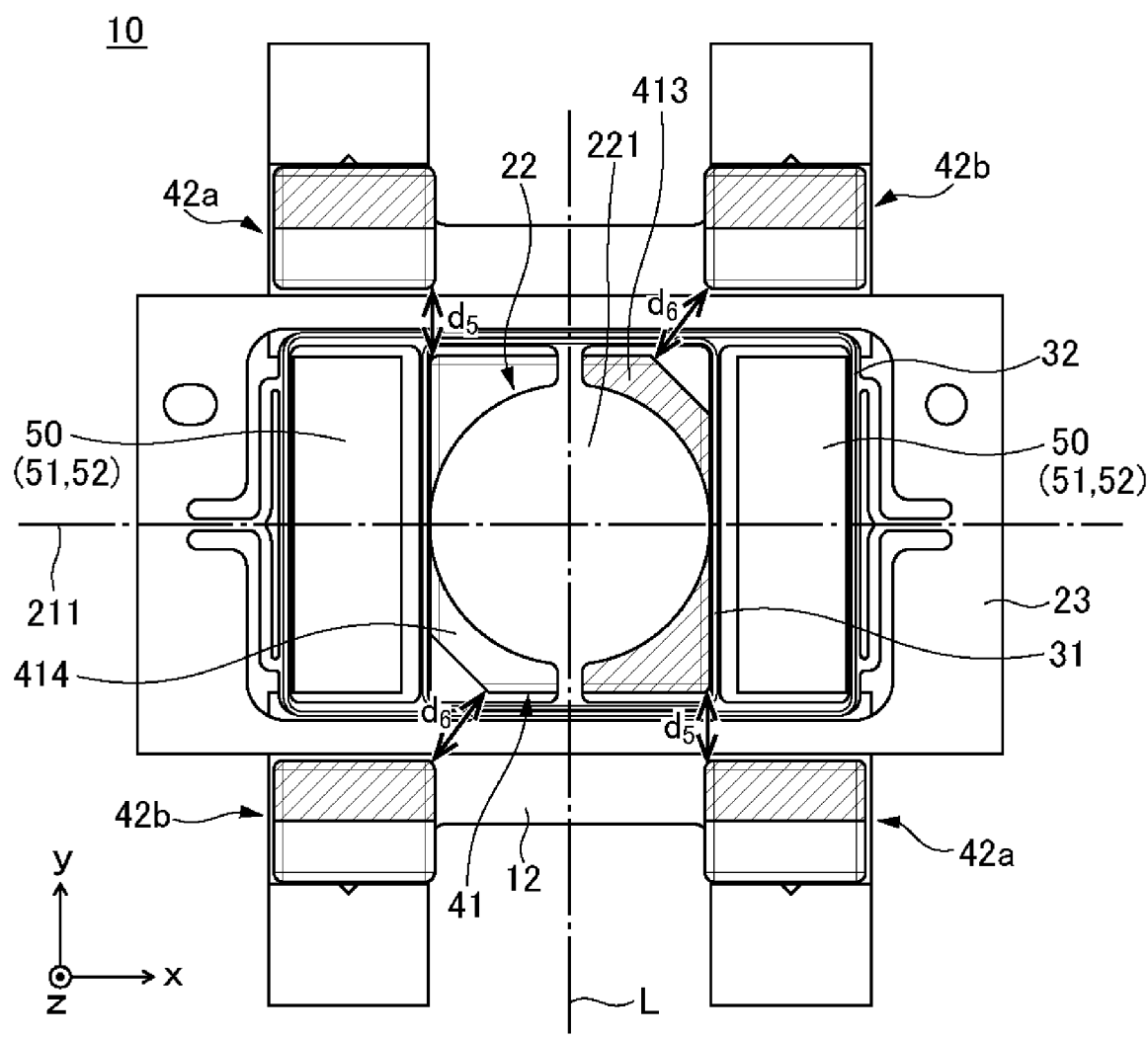
FIG. 19 is a plan view illustrating a configuration of a drive device according to Example 4.

FIG. 19 is a plan view illustrating the configuration of the drive device 10 according to Example 4. The drive device 10 according to this example has the same configuration as the drive device 10 according to at least one of the embodiment and Examples 1 to 3 except for the points described below. The distance measurement apparatus 90 according to this example has the same configuration as the distance measurement apparatus 90 according to Example 1.

In the drive device 10 of this example, the N pole and the S pole are aligned on the surface of the first magnet 41 on the first coil 31 side. When viewed from the first direction, a plurality of the second magnets 42 are positioned around the first magnet 41. At least the second coil 32 is positioned between the first magnet 41 and the plurality of second magnets 42. Among distances the first magnet 41 and the plurality of second magnets 42, a distance $d_5$ between portions where the same polarity faces is different from a distance $d_6$ between portions where different polarity faces. Specifically, in the example of this figure, among the distances of the first magnet 41 and the plurality of second magnets 42, the distance $d_5$ between the portions where the same polarity faces is narrower than the distance $d_6$ between the portions where the different polarity faces. Details will be described below.

As illustrated in FIG. 6, magnetic flux acting on the second coil 32 is asymmetric with respect to the center line L of the first movable portion 21 orthogonal to the second axis 211. This is because magnetic flux density is different depending on whether the same polarity faces or the different polarity faces at the facing portion of the second magnet 42 and the first magnet 41. Specifically, when the same polarity faces, magnetic flux from the second magnet 42 jumps to the second facing member 52, and the peak of magnetic flux density becomes high. On the other hand, when the different polarity faces, magnetic flux from the second magnet 42 is pulled by the first magnet 41, and the peak of magnetic flux density is lowered. When this asymmetry is large, the force generated in the second coil 32 will be unbalanced, and twisting may occur in swinging with the second axis 211 as a reference.

In contrast, in the drive device 10 according to this example, among the distances between the first magnet 41 and the plurality of second magnets 42, the distance $d_5$ between the portions where the same polarity faces is narrower than the distance $d_6$ between the portions where the different polarity faces. Accordingly, the peak difference between the left and right magnetic flux densities can be reduced, and magnetic flux acting on the second coil 32 can be brought closer to a symmetrical state with respect to the center line L. As a result, it is possible to realize more accurate swinging with the second axis 211 as an axis.

In the example illustrated in FIG. 19, the second magnet 42a faces the first magnet 41 so that the same polarity faces each other. The second magnet 42b faces the first magnet 41 so that different polarity faces each other. The planar shape of the first magnet 41 is a rectangle in which a notch is provided at the corner on the second magnet 42a side so as to be asymmetric with respect to the center line L. The planar shape is a shape when viewed from the first direction.

As a method of making the distance $d_5$ between the portions where the same polarity faces narrower than the distance $d_6$ between the portions where the different polarity faces, in addition to a first method of making the shape of the first magnet 41 asymmetric as illustrated in this figure, for example, a second method, a third method, and the like described below can be considered.

In the second method, the second magnet 42a and the second magnet 42b have different shapes. Specifically, instead of providing a notch in the first magnet 41, a notch is provided in the corner on the first magnet 41 side of the second magnet 42b. The notches may be provided in both the second magnet 42b and the first magnet 41.

In the third method, the relative position of the second magnet 42a and the first magnet 41 is made different from the relative position of the second magnet 42b and the first magnet 41. Specifically, the second magnet 42b is disposed apart from the first magnet 41 so that disposition of the plurality of second magnets 42 is asymmetric with respect to the center line L.

As described above, according to this example, magnetic flux from the first magnet 41 acts on the first coil 31 similarly as in the embodiment. Magnetic flux from the second magnet 42 acts on the second coil 32. As such, the magnetic circuits different from each other act on the first coil 31 and the second coil 32, thereby capable of achieving miniaturization of the drive device 10 for two-axis drive. In addition, mutual interference in drive in two directions with different axes is reduced.

In addition, according to this example, among the distances between the first magnet 41 and the plurality of second magnets 42, the distance $d_5$ between the portions where the same polarity faces is narrower than the distance $d_6$ between the portions where the different polarity faces. Accordingly, magnetic flux acting on the second coil 32 can be brought closer to a symmetrical state with respect to the center line L. As a result, it is possible to realize more accurate swinging with the second axis 211 as an axis.

Example 5

Figure 20:
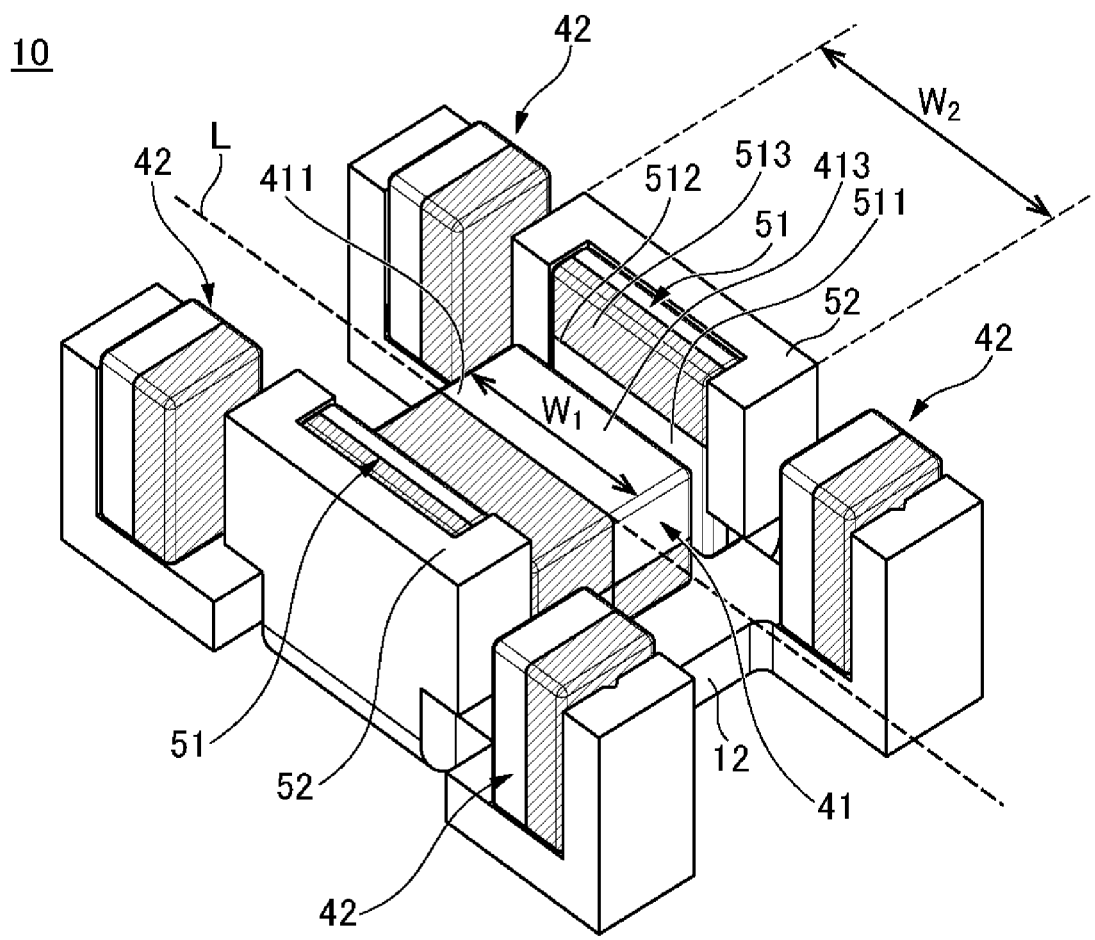
FIG. 20 is a perspective view illustrating a structure of a base, a first magnet, a second magnet, a first facing member, and a second facing member according to Example 5.

FIG. 20 is a perspective view illustrating the structures of the base 12, the first magnet 41, the second magnet 42, the first facing member 51, and the second facing member 52 according to Example 5. In the figure, the drive unit 20, the first coil 31, and the second coil 32 are omitted. The drive device 10 according to this example is the same as the drive device 10 according to at least one of the embodiment and Examples 1 to 4 except for the structures of the first magnet 41, the first facing member 51, and the second facing member 52. Further, the distance measurement apparatus 90 according to this example has the same configuration as the distance measurement apparatus 90 according to Example 1.

In this example, the first facing member 51 and the second facing member 52 have structures independent of each other. The first facing member 51 is a magnet and the second facing member 52 is a yoke. In the example of this figure, the second facing member 52 has a rectangular shape in which a recess is provided on the surface on the side of the first magnet 41 when viewed from the first direction, and the first facing member 51 is fitted in the recess. The structure of the second facing member 52 is not limited to the example of this figure, for example, the second facing members 52 facing to the respective second magnets 42 may be provided independently and fixed to both ends of the first facing member 51.

Since the first facing member 51 is a magnet, magnetic flux from the first magnet 41 can be more strongly pulled to the first facing member 51 side. Accordingly, drive efficiency is enhanced. Further, the influence of the first magnet 41 on magnetic flux between the second magnet 42 and the second facing member 52 is reduced, and symmetry of magnetic flux with respect to the center line L is improved.

In the example of this figure, a width $w_1$ of the first magnet 41 in the direction parallel to the center line L when viewed from the first direction is small. Accordingly, the influence of the first magnet 41 on magnetic flux between the second magnet 42 and the second facing member 52 is reduced, and the symmetry of magnetic flux with respect to the center line L is improved. Specifically, for example, when the distance between two surfaces of the first facing member 51 facing each of the two second magnets 42 facing each other in the direction parallel to the center line L is set as $w_2$, the width $w_1$ of the first magnet 41 is equal to or less than 1 time of $w_2$, or more preferably equal to or less than 0.8 times of $w_2$. The first facing member 51 and the first magnet 41 are disposed symmetrically with respect to a center line perpendicular to the center line L when viewed from the first direction.

The relationship between the first magnet 41 and the first facing member 51 according to this embodiment will be described in detail below. In this example, the S pole and the N pole are aligned in the z-direction on the surface 511 of the first facing member 51 on the first magnet 41 side. Further, polarity of a surface of the first facing member 51 opposite to the first magnet 41 is inverted from polarity of a surface 511. The disposition of the S pole and the N pole in the first magnet 41 is the same as the disposition described in the embodiment.

Furthermore, in the example of this figure, a boundary 512 between the S pole and the N pole in the surface 511 is closer to the first coil 31 than the surface 411 of the first magnet 41 in the z-direction. When polarity of an area 513 on the upper side of the boundary 512, that is, the first coil 31 side, is set as the first polarity, polarity of an area 413 of the surface 411 of the first magnet 41 on the side facing the first facing member 51 is second polarity different from the first polarity. Accordingly, even when the first coil 31 is deviated from the first magnet 41 in the z-direction, magnetic flux from the area 413 of the first magnet 41 can be strongly pulled toward the area 513, and much magnetic flux between the first magnet 41 and the first facing member 51 can act on the first coil 31. As a result, the drive efficiency can be improved.

As described above, according to this example, magnetic flux from the first magnet 41 acts on the first coil 31 similarly as in the embodiment. Magnetic flux from the second magnet 42 acts on the second coil 32. As such, the magnetic circuits different from each other act on the first coil 31 and the second coil 32, thereby capable of achieving miniaturization of the drive device 10 for two-axis drive. Further, mutual interference in drive in two directions with different axes is reduced.

In addition, according to this example, since the first facing member 51 is a magnet, magnetic flux from the first magnet 41 can be more strongly pulled to the first facing member 51 side. Accordingly, the drive efficiency is enhanced. The influence of the first magnet 41 on magnetic flux between the second magnet 42 and the second facing member 52 is reduced, and the symmetry of magnetic flux with respect to the center line L is improved.

Example 6

Figure 21:
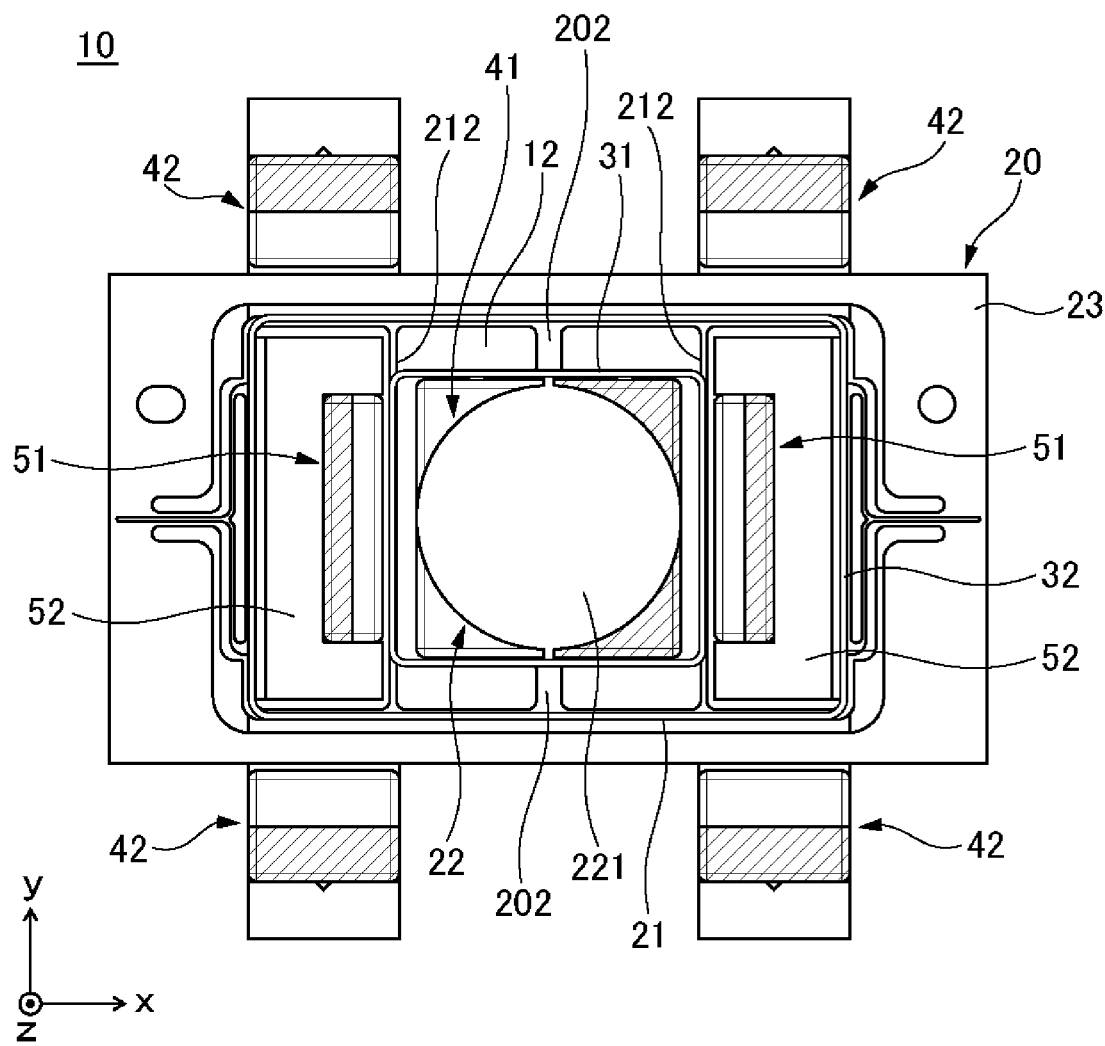
FIG. 21 is a plan view illustrating a structure of a drive device according to Example 6.

FIG. 21 is a plan view illustrating the structure of the drive device 10 according to Example 6. The drive device 10 according to this example is the same as the drive device 10 according to at least one of the embodiment and Examples 1 to 5, except for the structure of the first coil 31. Further, the distance measurement apparatus 90 according to this example has the same configuration as the distance measurement apparatus 90 according to Example 1. This figure illustrates an example in which the drive device 10 has the same configuration as that of Example 5, but is not limited to the example of this figure.

In this example, the width of the first coil 31 in the direction (y-direction) parallel to the first axis 222 is smaller than the width of the second coil 32 in the direction parallel to the first axis 222. Also, in this example, the first coil 31 is fixed to the first movable portion 21. The first coil 31 and the second coil 32 do not overlap when viewed from the first direction. Specifically, the first coil 31 is provided along a part of the first loop portion 212 and is provided to cross the connection portion 202. The lead wire (not illustrated) of the first coil 31 can be provided along the first loop portion 212 or the connection portion 202. In the example of this figure, the connection portion 202 has different widths on the inside and the outside of the first coil 31. However, the widths of the connection portion 202 may be the same on the inside and the outside of the first coil 31. In addition, in the portion overlapping the first coil 31, when viewed from the first direction, the first movable portion 21 may be provided entirely, or the first movable portion 21 may not be provided at least in a part of the portion overlapping the first coil 31.

In the example of this figure, the first magnet 41 is positioned inside the first coil 31 when viewed from the first direction. Accordingly, the distance from the second magnet 42 is sufficiently large, and the influence of the first magnet 41 on magnetic flux between the second magnet 42 and the second facing member 52 is reduced. As a result, the symmetry of magnetic flux with respect to the center line L is improved.

As described above, according to this example, magnetic flux from the first magnet 41 acts on the first coil 31 similarly as in the embodiment. Magnetic flux from the second magnet 42 acts on the second coil 32. As such, the magnetic circuits different from each other act on the first coil 31 and the second coil 32, thereby capable of achieving miniaturization of the drive device 10 for two-axis drive. In addition, mutual interference in drive in two directions with different axes is reduced.

Although the embodiment and examples have been described with reference to the figures, these are only examples of the present invention, and various configurations other than those described above can be adopted.

This application is based upon and claims the benefit of priority from Japanese Patent Application No. 2017-047438, filed Mar. 13, 2017, the entire contents of which are incorporated herein by reference.

The invention claimed is:

1. A drive device comprising:
a support;
a first movable portion swingable about a first axis and a second axis with respect to the support;
a first magnet positioned inside the first movable portion and a second magnet positioned outside the first movable portion when viewed from a first direction; and
a first coil on which magnetic flux from the first magnet acts to swing the first movable portion about the first axis and a second coil on which magnetic flux from the second magnet acts to swing the first movable portion about the second axis,
wherein an entirety of the first movable portion is swingable about the first axis and the second axis.

2. The drive device according to claim 1,
wherein the drive device is mounted on a distance measurement apparatus that emits light, and
the drive device changes a light emitting direction from the distance measurement apparatus.

3. A distance measurement apparatus comprising: the drive device according to claim 1.

4. The drive device according to claim 1, further comprising:
a second movable portion swingably attached to the first movable portion, and
connection portions which connect the first movable portion and the second movable portion,
wherein the connection portions are provided with no conductor wire.

5. A drive device comprising:
a support;
a first movable portion swingable about a first axis and a second axis with respect to the support;
a first magnet positioned inside the first movable portion and a second magnet positioned outside the first movable portion when viewed from a first direction;
a first coil on which magnetic flux from the first magnet acts to swing the first movable portion about the first axis and a second coil on which magnetic flux from the second magnet acts to swing the first movable portion about the second axis; and
a magnetic member including one or more facing members facing at least one of the first magnet and the second magnet,
wherein the first coil is fixed to the first movable portion, passes between the first magnet and the magnetic member, and does not pass between the second magnet and the magnetic member when viewed from the first direction, and
the second coil is fixed to the first movable portion, passes between the second magnet and the magnetic member, and does not pass between the first magnet and the magnetic member when viewed from the first direction.

6. The drive device according to claim 5,
wherein the first direction is a central axis direction of the first coil in a state in which no current flows in the first coil and the second coil.

7. The drive device according to claim 6, further comprising:
a second movable portion swingably attached to the first movable portion,
wherein the second movable portion is swingable with a first axis as an axis such that an angle of a reference surface is variable with respect to the first movable portion, and
the second movable portion includes a reflection surface as the reference surface.

8. The drive device according to claim 5,
wherein the facing member is a magnet or a yoke.

9. The drive device according to claim 5,
wherein the first magnet, the second magnet, and the magnetic member are fixed to the support.

10. The drive device according to claim 5,
wherein a portion of the first coil passing between the first magnet and the magnetic member is positioned inside the second coil when viewed from the first direction.

11. The drive device according to claim 5,
wherein a second movable portion is swingably attached to the first movable portion, and
the second movable portion is swingable with a first axis as an axis such that an angle of a reference surface is variable with respect to the first movable portion.

12. The drive device according to claim 11,
wherein the second movable portion includes a mirror whose reflection surface is the reference surface.

13. The drive device according to claim 11,
wherein the second movable portion is positioned inside the first coil when viewed from the first direction.

14. The drive device according to claim 11,
wherein the first magnet overlaps the second movable portion when viewed from the first direction.

15. The drive device according to claim 11,
wherein the first movable portion is swingable with a second axis, perpendicular to the first axis, as an axis with respect to the support.

16. The drive device according to claim 15,
wherein the first movable portion has a structure having a short-axis direction and a long-axis direction when viewed from the first direction, and the short-axis direction is parallel to the first axis and the long-axis direction is parallel to the second axis.

17. The drive device according to claim 15,
wherein the drive device is mounted on a moving body, and a resonance frequency of vibration of the first movable portion with the second axis as an axis is equal to or more than 500 Hz.

18. The drive device according to claim 5,
wherein an N pole and an S pole are aligned on a surface of the first magnet on a side of the first coil,
a plurality of the second magnets are positioned around the first magnet when viewed from the first direction,
at least the second coil is positioned between the first magnet and the plurality of second magnets, and
among distances between the first magnet and the plurality of second magnets, a distance between portions where same polarities face each other is narrower than a distance between portions where different polarities face each other.

19. The drive device according to claim 5,
wherein the magnetic member includes a first facing member facing the first magnet and a second facing member facing the second magnet, and
the first facing member is a magnet, and the second facing member is a yoke.

20. The drive device according to claim 5,
wherein polarity of a surface of the first magnet opposite to the first coil side is inverted from polarity of the surface of the first coil side.

21. The drive device according to claim 5,
wherein the first coil and the second coil are formed by winding around a same conductor wire.

22. The drive device according to claim 5,
wherein the first coil and the second coil are formed by winding around different conductor wires from each other,
a first lead wire and a second lead wire are respectively connected to both electrical ends of the first coil, and
at least a part of the first lead wire and at least a part of the second lead wire overlap at a portion passing between the second magnet and the magnetic member.

23. A drive device comprising:
a support;
a first movable portion swingable about a first axis and a second axis with respect to the support;
a first magnet positioned inside the first movable portion and a second magnet positioned outside the first movable portion when viewed from a first direction; and
a first coil on which magnetic flux from the first magnet acts to swing the first movable portion about the first axis and a second coil on which magnetic flux from the second magnet acts to swing the first movable portion about the second axis,
wherein the first magnet is positioned inside the first coil when viewed from the first direction.

24. A drive device comprising:
a support;
a first movable portion swingable about a first axis and a second axis with respect to the support;
a first magnet positioned inside the first movable portion and a second magnet positioned outside the first movable portion when viewed from a first direction; and
a first coil on which magnetic flux from the first magnet acts to swing the first movable portion about the first axis and a second coil on which magnetic flux from the second magnet acts to swing the first movable portion about the second axis,
wherein the first movable portion comprises a frame and one or more cross-bars extending from a side of the frame to another side of the frame.

* * * * *